(12) United States Patent
Kitagawa et al.

(10) Patent No.: US 7,940,517 B2
(45) Date of Patent: May 10, 2011

(54) ELECTRONIC DEVICE

(75) Inventors: Nobuhiro Kitagawa, Saitama (JP);
Michinobu Yanagisawa, Kanagawa (JP); Mamoru Abe, Kanagawa (JP); Takashi Uchiumi, Tokyo (JP); Naoko Sema, Kanagawa (JP)

(73) Assignee: Sony Corporation (JP)

( * ) Notice: Subject to any disclaimer, the term of this patent is extended or adjusted under 35 U.S.C. 154(b) by 251 days.

(21) Appl. No.: 12/287,596

(22) Filed: Oct. 10, 2008

(65) Prior Publication Data
US 2009/0103914 A1    Apr. 23, 2009

(30) Foreign Application Priority Data
Oct. 17, 2007    (JP) ............................... P2007-270009

(51) Int. Cl.
    *H05K 5/00*     (2006.01)
    *B65D 43/12*    (2006.01)
    *B65D 85/38*    (2006.01)
    *G03B 17/02*    (2006.01)

(52) U.S. Cl. ........... 361/679.01; 361/679.02; 220/345.1; 220/345.2; 220/345.3; 396/535; 396/536; 206/316.2

(58) Field of Classification Search ............. 361/679.01, 361/679.02, 679.08, 679.09, 679.3, 679.55–679.59; 220/345.1–345.4, 348, 351; 396/536; 206/316.2
See application file for complete search history.

(56) References Cited

U.S. PATENT DOCUMENTS

| | | | | |
|---|---|---|---|---|
| 7,654,406 B2 * | 2/2010 | Yanagisawa et al. | ...... | 220/345.3 |
| 2006/0163095 A1 * | 7/2006 | Yanagisawa et al. | ...... | 206/316.2 |
| 2008/0132303 A1 * | 6/2008 | Naukkarinen et al. | ..... | 455/575.4 |
| 2009/0103253 A1 * | 4/2009 | Yeh | .......................... | 361/679.05 |

FOREIGN PATENT DOCUMENTS
JP        2002-072290 A        3/2002
* cited by examiner

*Primary Examiner* — Jayprakash N Gandhi
*Assistant Examiner* — Jerry Wu
(74) *Attorney, Agent, or Firm* — Lerner, David, Littenberg, Krumholz & Mentlik, LLP

(57) ABSTRACT

There is provided an electronic device including: a housing included in an exterior package; and a plate-like cover that is provided for one face of the housing and is movable between a close position and an open position. The one face includes an open/close face and a non-open/close. The open/close face is hidden by the cover at a close position of the cover and is exposed from the cover at an open position of the cover. The non-open/close face is exposed from the cover at the close position of the cover and is hidden by the cover at the open position of the cover. A support mechanism is provided to movably support the cover between the close position and the open position. The non-open/close face protrudes frontward from the face for a thickness of the cover in comparison with the open/close face. The support mechanism includes: two first contact members protruding toward the one face from locations on the cover with an interval in a direction orthogonal to a direction of moving the cover; a first guide face that is provided toward the one face, extends along a direction of moving the cover, and is capable of contacting with the two first contact members between the close position and the open position; and an oscillation regulating mechanism for regulating oscillation of the cover at a supporting point where the first contact member contacts with the first guide face.

11 Claims, 37 Drawing Sheets

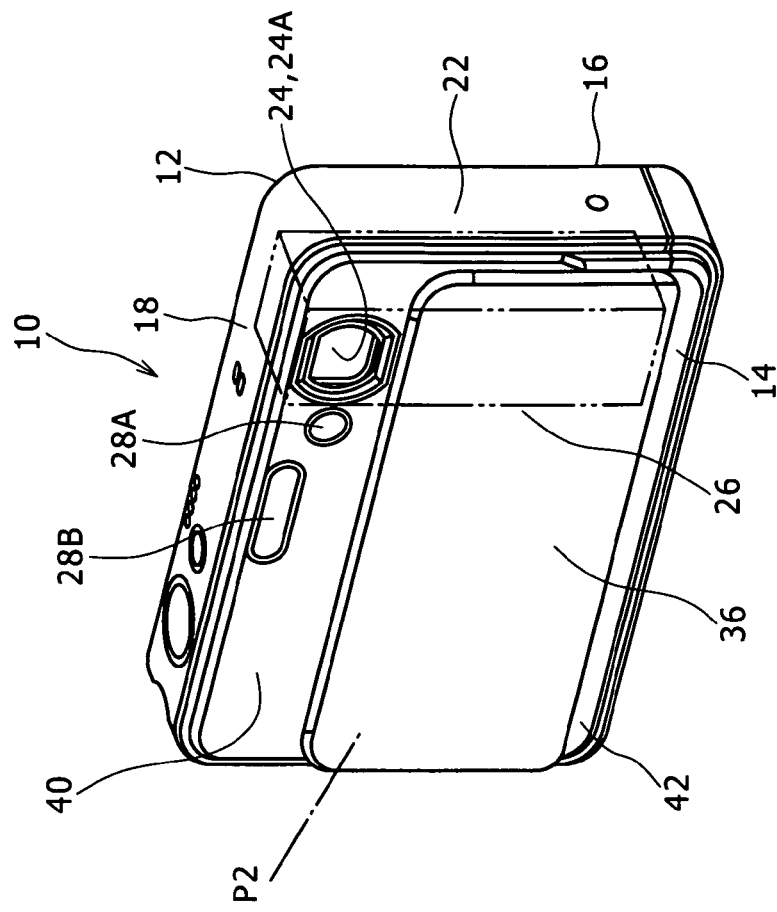
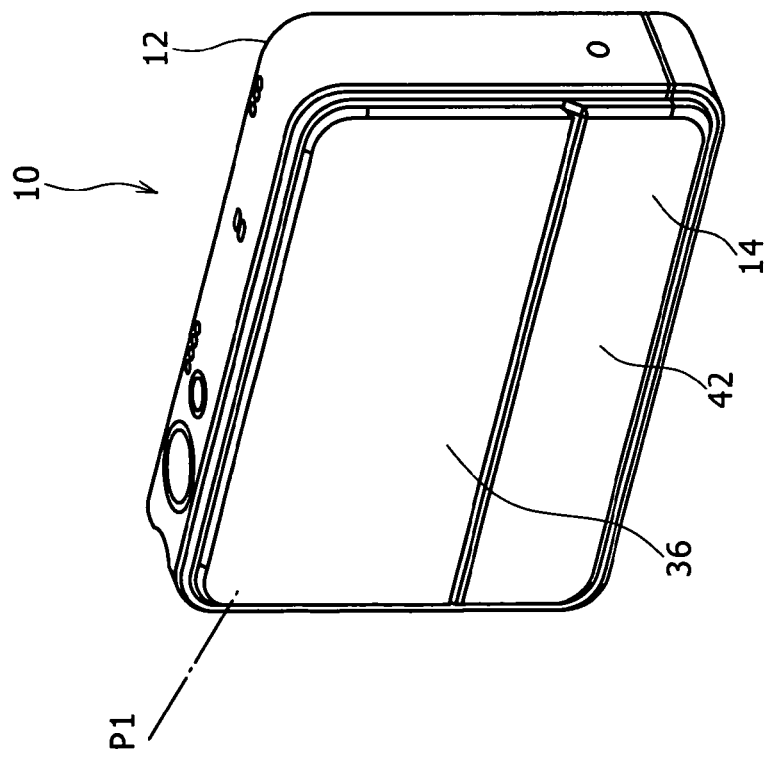

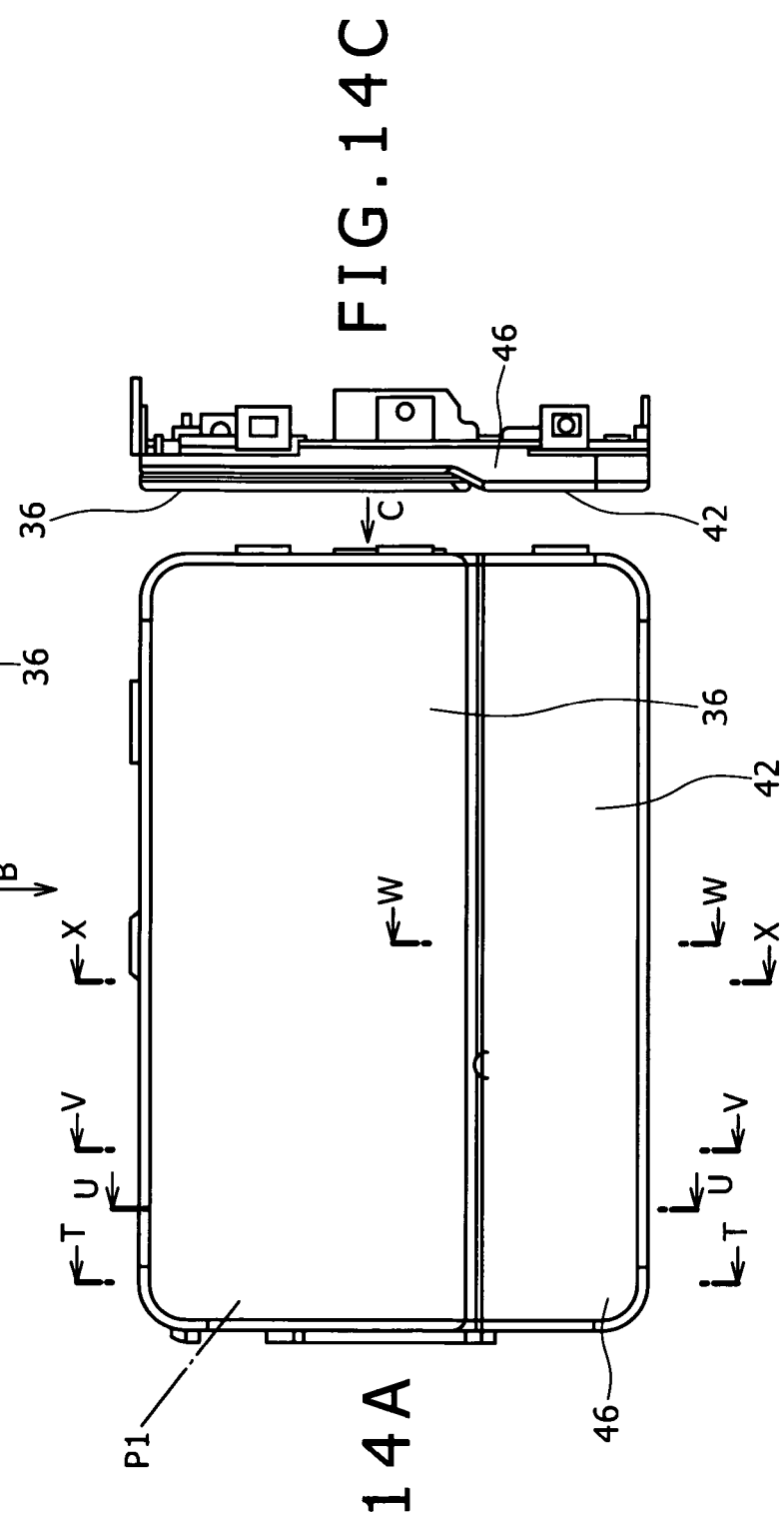

T-T  U-U  V-V

FIG.16W
FIG.16X
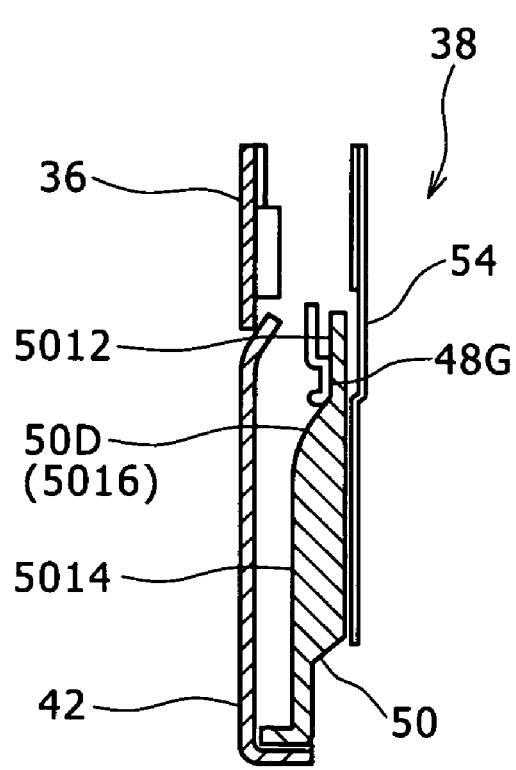
W-W
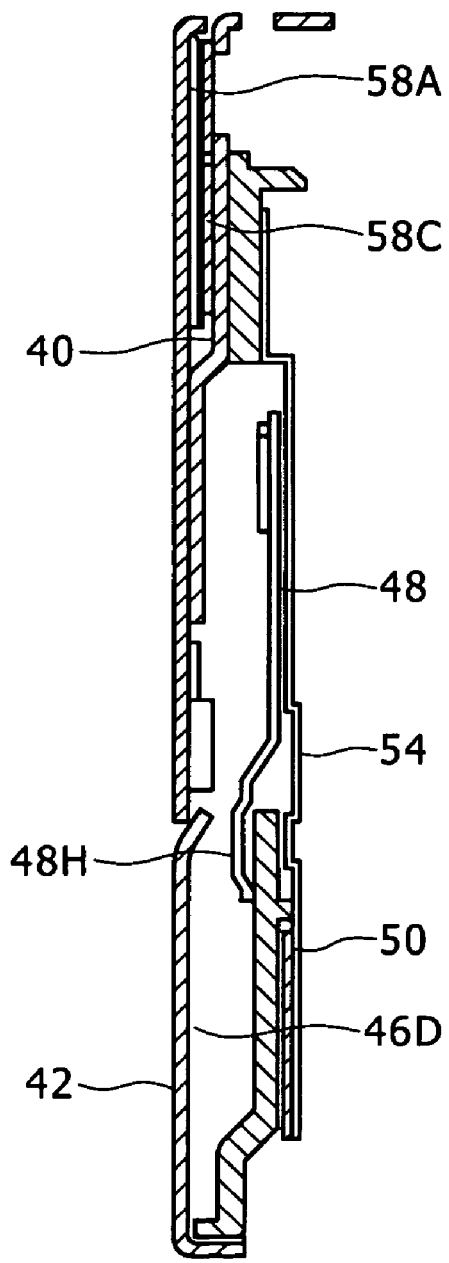
X-X

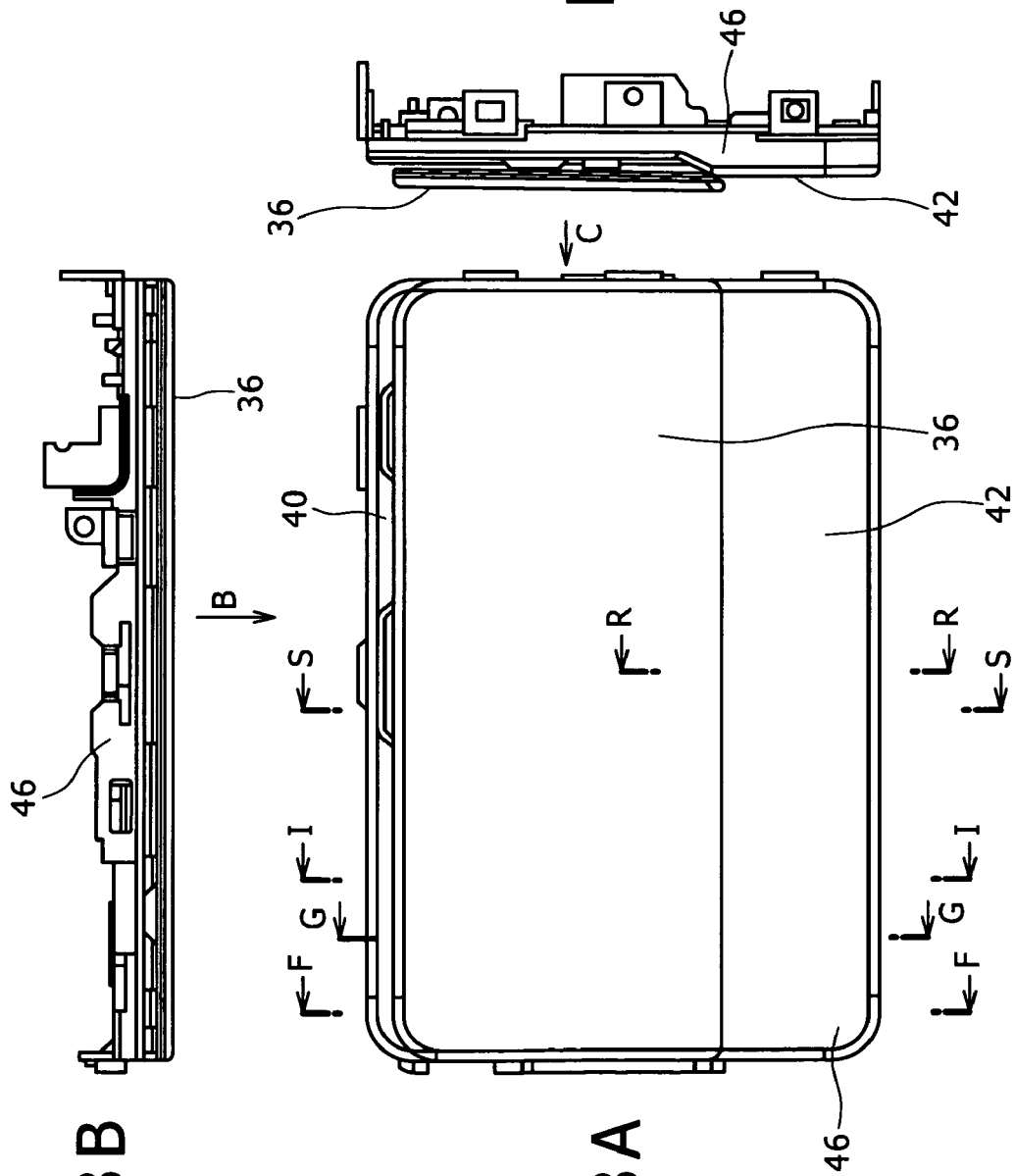

F-F  G-G  I-I

R-R

S-S

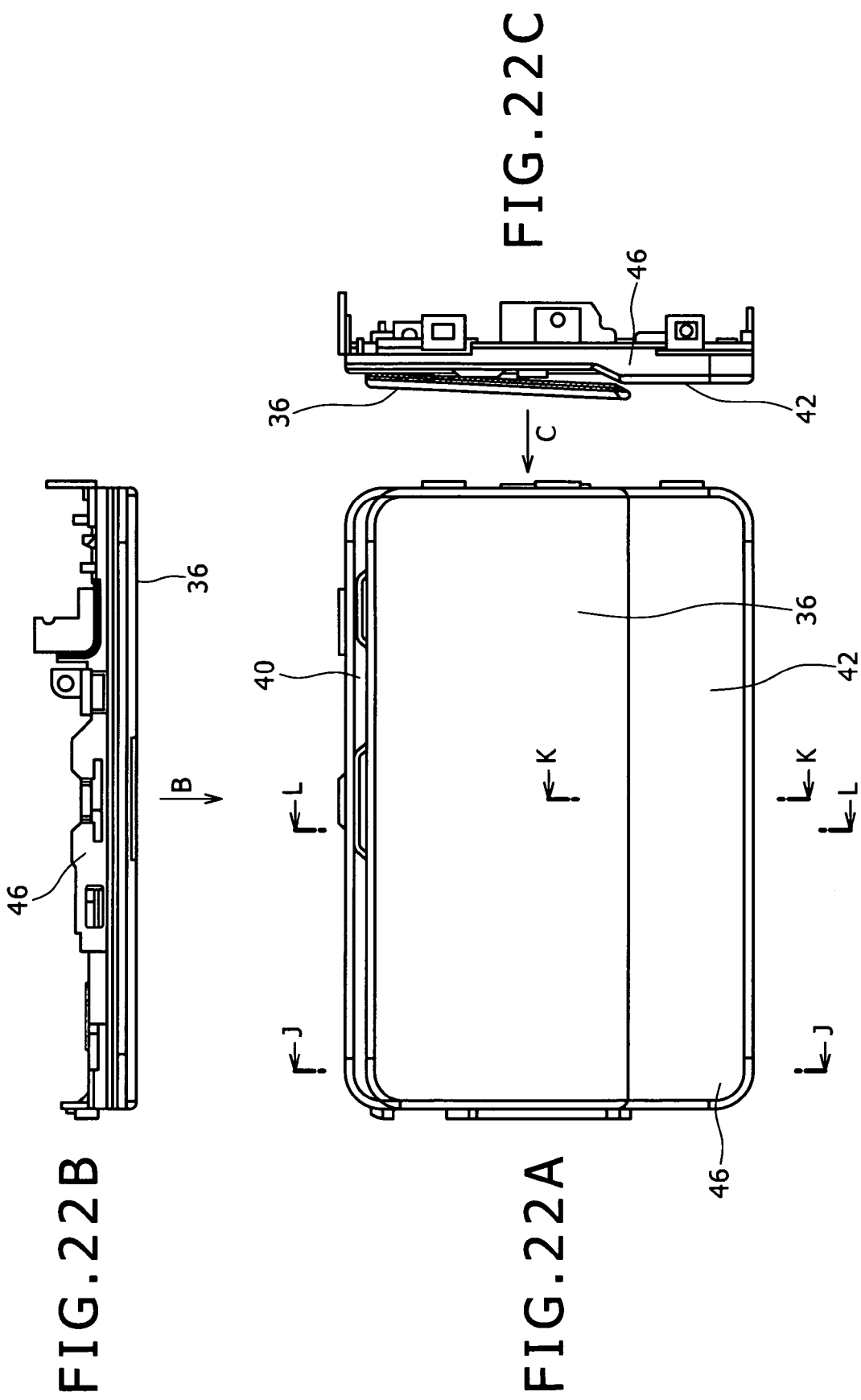

J-J  K-K  L-L

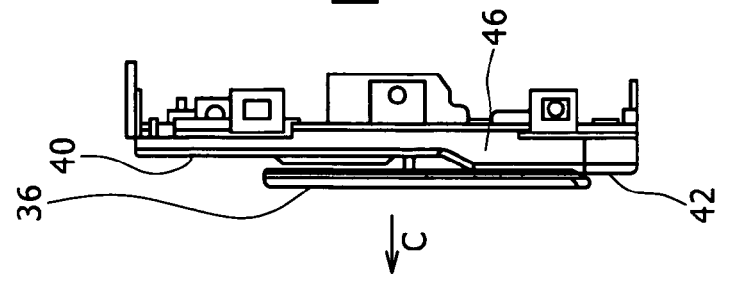
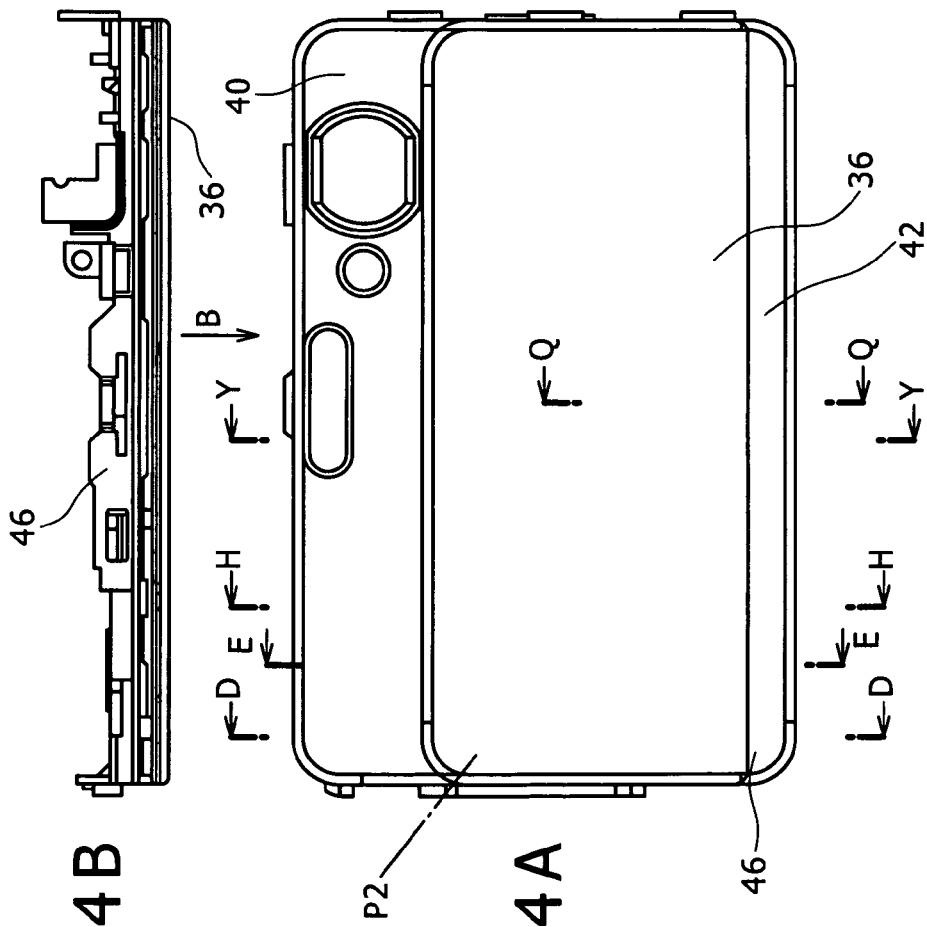

D-D    E-E    H-H

Q-Q

Y-Y

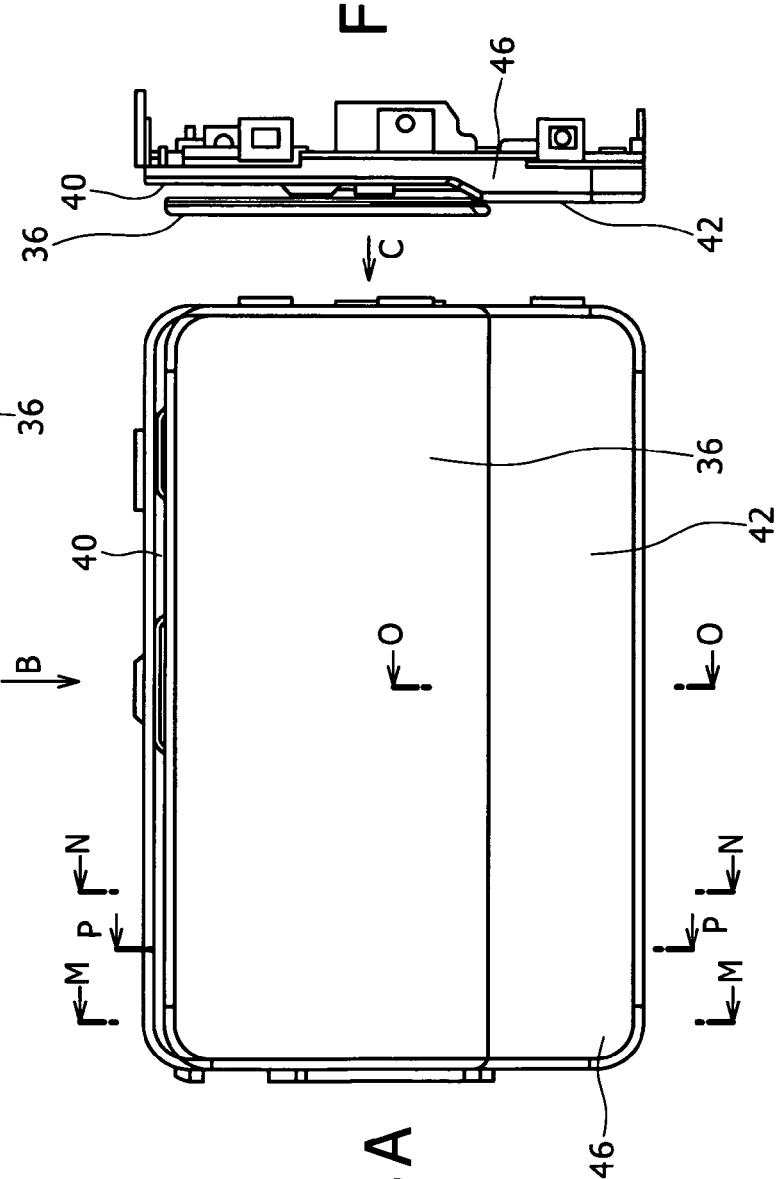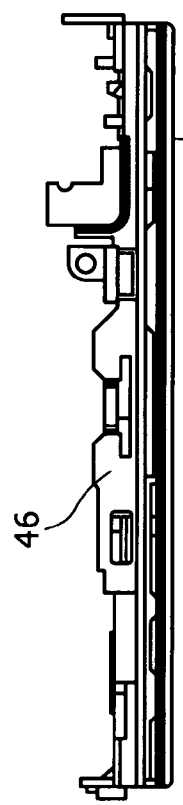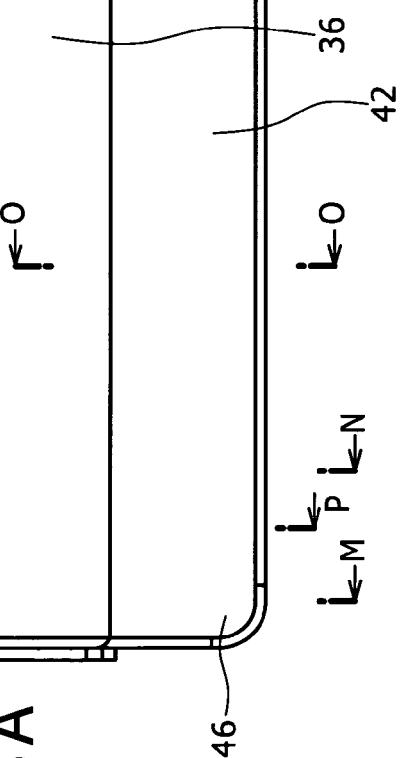

M-M   N-N   O-O   P-P

ELECTRONIC DEVICE

CROSS REFERENCES TO RELATED APPLICATIONS

The present invention contains subject matter related to Japanese Patent Application JP 2007-270009 filed in the Japanese Patent Office on Oct. 17, 2007, the entire contents of which being incorporated herein by reference.

BACKGROUND OF THE INVENTION

1. Field of the Invention

The invention relates to an electronic device.

2. Description of Related Art

Some electronic devices such as digital still cameras use a plate-like cover (lens barrier) for opening and closing an objective lens to protect the objective lens and the other parts.

As a known example, the electronic device is provided with an objective lens at the front of a housing formed as an exterior package of the electronic device. The electronic device has a support mechanism that supports the cover between a close position for covering the objective lens and an open position for exposing the objective lens.

The support mechanism is proposed so that the cover is positioned at the front near the objective lens in the open position and forms almost the same face as the front face of the housing in the close position (see JP-A No. 2002-72290).

The support mechanism includes a guide pin and a guide groove. The guide pin protrudes from the cover inside horizontally or vertically. The guide groove is provided for the housing. The guide pin is guided along the guide groove to move the cover along the guide groove.

SUMMARY OF THE INVENTION

For example, the above-mentioned support mechanism can smoothly move the cover when the cover is opened and closed by applying a force to the cover in a direction of moving the cover. Opening and closing the cover by pressing it applies an unnecessary force to a guide pin and a guide groove. It is difficult to smoothly move the cover. A load may be applied to the support mechanism.

The present invention has been made in consideration of the foregoing. It is desirable to provide an electronic device advantageous for improving operability and support mechanism durability.

According to an embodiment of the present invention, there is provided an electronic device including: a housing included in an exterior package; and a plate-like cover that is provided for one face of the housing and is movable between a close position and an open position. The one face includes an open/close face and a non-open/close. The open/close face is hidden by the cover at a close position of the cover and is exposed from the cover at an open position of the cover. The non-open/close face is exposed from the cover at the close position of the cover and is hidden by the cover at the open position of the cover. A support mechanism is provided to movably support the cover between the close position and the open position. The non-open/close face protrudes frontward from the face for a thickness of the cover in comparison with the open/close face. The support mechanism includes: two first contact members protruding toward the one face from locations on the cover with an interval in a direction orthogonal to a direction of moving the cover; a first guide face that is provided toward the one face, extends along a direction of moving the cover, and is capable of contacting with the two first contact members between the close position and the open position; and an oscillation regulating mechanism for regulating oscillation of the cover at a supporting point where the first contact member contacts with the first guide face.

According to an embodiment of the invention, the support mechanism movably supports the cover between the close position and the open position. The support mechanism is configured to include the oscillation regulating mechanism that regulates cover oscillation around a supporting point where the first contact member contacts with the first guide face. No unnecessary force is applied to the support mechanism when the cover is opened and closed by applying a force to the cover in a direction of moving the cover or by pressing the cover so as to apply a force to the cover in a direction orthogonal to the direction of moving the cover. This is advantageous for improving operability and durability of the support mechanism.

BRIEF DESCRIPTION OF THE DRAWINGS

Embodiments of the present invention will be described in detail based on the following figures, wherein:

FIG. 1A is a perspective view of an imaging device 10 with a cover 36 at a close position P1;

FIG. 1B is a perspective view of the imaging device 10 with the cover 36 at an open position P2;

FIG. 14A is a front view showing the cover 36 positioned at the close position P1;

FIG. 14B is a side view of FIG. 14A viewed along an arrow B;

FIG. 14C is a side view of FIG. 14A viewed along an arrow C;

FIG. 16W is a cross sectional view taken along the line WW of FIG. 14A;

FIG. 16X is a cross sectional view taken along the line XX of FIG. 14A;

FIG. 18A is a front view showing the cover 36 moving from the close position P1 to the open position P2;

FIG. 18B is a side view of FIG. 18A viewed along an arrow B;

FIG. 18C is a side view of FIG. 18A viewed along an arrow C;

FIG. 22A is a front view showing the cover 36 moving from the close position P1 to the open position P2 while the cover 36 is pressed toward the rear;

FIG. 22B is a side view of FIG. 22A viewed along an arrow B;

FIG. 22C is a side view of FIG. 22A viewed along an arrow C;

FIG. 24A is a front view showing the cover 36 positioned at the open position P2;

FIG. 24B is a side view of FIG. 24A viewed along an arrow B;

FIG. 24C is a side view of FIG. 24A viewed along an arrow C;

FIG. 28A is a front view showing the cover 36 positioned immediately before the close position P1;

FIG. 28B is a side view of FIG. 28A viewed along an arrow B;

FIG. 28C is a side view of FIG. 28A viewed along an arrow C;

DETAILED DESCRIPTION OF THE PREFERRED EMBODIMENTS

Embodiments of the present invention will be described in further detail with reference to the accompanying drawings.

The embodiment assumes an imaging device 10 to be the electronic device.

Figure 2:
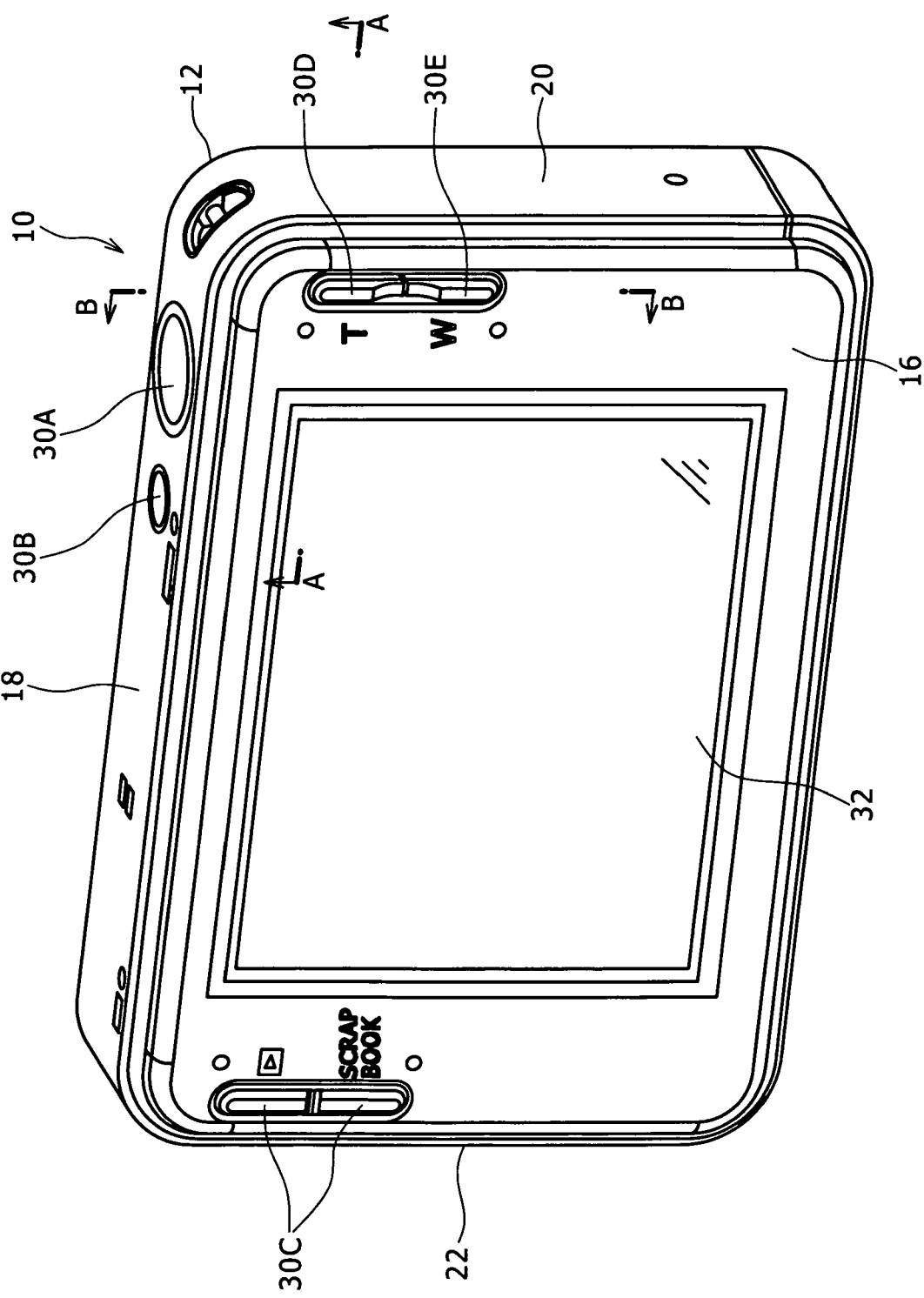
FIG. 2 is a perspective view of the imaging device 10 viewed from the rear.
Figure 3:
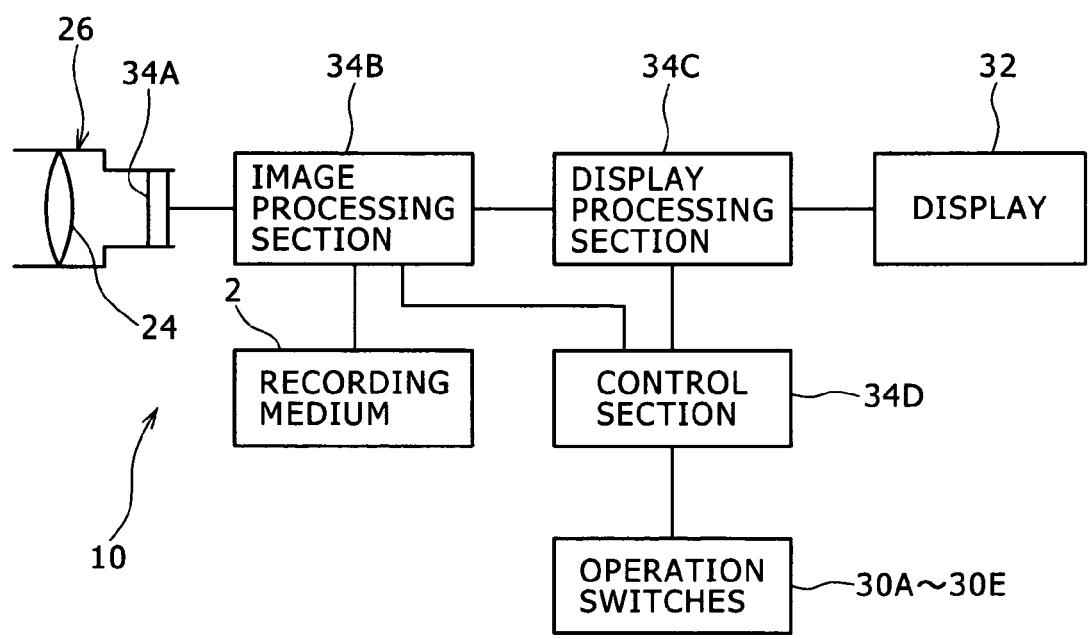
FIG. 3 is a block diagram showing a configuration of the imaging device 10.

FIG. 1A is a perspective view of the imaging device 10 with a cover 36 at a close position P1. FIG. 1B is a perspective view of the imaging device 10 with the cover 36 at an open position P2. FIG. 2 is a perspective view of the imaging device 10 viewed from the rear. FIG. 3 is a block diagram showing a configuration of the imaging device 10.

As shown in FIGS. 1A, 1B and 2, the imaging device 10 according to the embodiment represents a digital still camera.

The imaging device 10 includes a housing 12 included in an exterior package. The specification assumes that the front side faces an object and the rear side concerns image formation. Left and right of the imaging device 10 take effect when the imaging device 10 is viewed from the front.

The housing 12 has a thickness in a direction between the front and rear sides, a height in a vertical direction, and a width in a direction between the left and right sides. The height is greater than the thickness. The width is greater than the height. The housing 12 is formed into a flat, thin, rectangular parallelepiped.

The housing 12 includes a front face 14 toward the front, a rear face 16 toward the rear, a top face 18 toward the top, a bottom face toward the bottom, and left and right side faces 20 and 22 corresponding to the left and right sides of the housing 12.

The front face 14 is provided with the cover 36 supported by a support mechanism 38 (FIGS. 15 and 16) to be described later.

As shown in FIG. 1B, the right part of the housing 12 is provided with a lens barrel 26 (FIG. 8) so as to extend vertically. The lens barrel 26 contains an optical imaging system 24. The objective lens is positioned at the forefront of the optical imaging system 24.

The optical imaging system 24 according to the embodiment uses a zoom optical system capable of variable zoom ratios.

An opening is provided at the top right of the front face 14 of the housing 12. An objective lens 24A is provided at the forefront of the optical imaging system 24 and faces toward the front through the opening.

The optical imaging system 24 includes not only the objective lens 24A but also, though not shown, a prism, multiple lenses, and a diaphragm mechanism. The prism is located behind the objective lens 24A and bends an optical path 90 degrees downward. The lenses are arranged along the optical path below the prism. The diaphragm mechanism is also arranged along the optical path.

A light-emitting section 28A and a flash section 28B are provided on the front face 14 to the left of the objective lens 24A. The light-emitting section 28A radiates illumination light for measuring a focal length. The flash section 28B generates auxiliary illumination light (flash).

As shown in FIG. 2, a power switch 30A and a shutter button 30B are provided on the top face 18 of the housing 12.

At the top right on the rear face 16 of the housing 12, an operation switch 30C is provided for various operations such as switching between imaging and reproducing modes. At the top left of the rear face 16, a telescopic switch 30D and a wide-angle switch 30E are provided vertically. The telescopic switch 30D adjusts a zoom ratio of the optical imaging system 24 to the telescopic side. The wide-angle switch 30E adjusts a zoom ratio of the optical imaging system 24 to the wide-angle side.

At the center of the rear face 16, a display 32 is provided to display captured video.

As shown in FIG. 3, the imaging device 10 includes an imaging element 34A, an image processing section 34B, a display processing section 34C, and a control section 34D. The imaging element 34A uses a CCD or CMOS sensor to capture an image formed by the optical imaging system 24. The image processing section 34B uses an imaging signal output from the imaging element 34A to generate image data and records the image data on a recording medium 2 such as a memory card. The display processing section 34C displays the image data on the display 32. The control section 34D includes a CPU that controls the image processing section 34B and the display processing section 34C in accordance with operations of operation switches 30A through 30E.

The following describes the cover 36 and the support mechanism 38 according to an embodiment of the invention.

As shown in FIGS. 1A and 1B, the cover 36 is movable between the close position P1 and the open position P2 on the front face 14.

The front face 14 includes an open/close face 40 and a non-open/close face 42. An intermediate face 41 is formed between the open/close face 40 and the non-open/close face 42. The cover 36, when moved to the close position P1, covers the open/close face 40. The cover 36, when moved to the open position P2, exposes the open/close face 40. The cover 36, when moved to the close position P1, exposes the non-open/close face 42. The cover 36, when moved to the open position P2, exposes the non-open/close face 42.

According to the embodiment, the open/close face 40 is provided with the objective lens 24A, the light-emitting section 28A, and the flash section 28B.

The width of the cover 36 is perpendicular to the direction of moving the cover 36. The width of the cover 36 equals that of the front face 14. When the cover 36 is positioned at the close position P1, the cover 36 and the non-open/close face 42 form the front face of the housing 12.

Figures 15T, 15U, 15V:
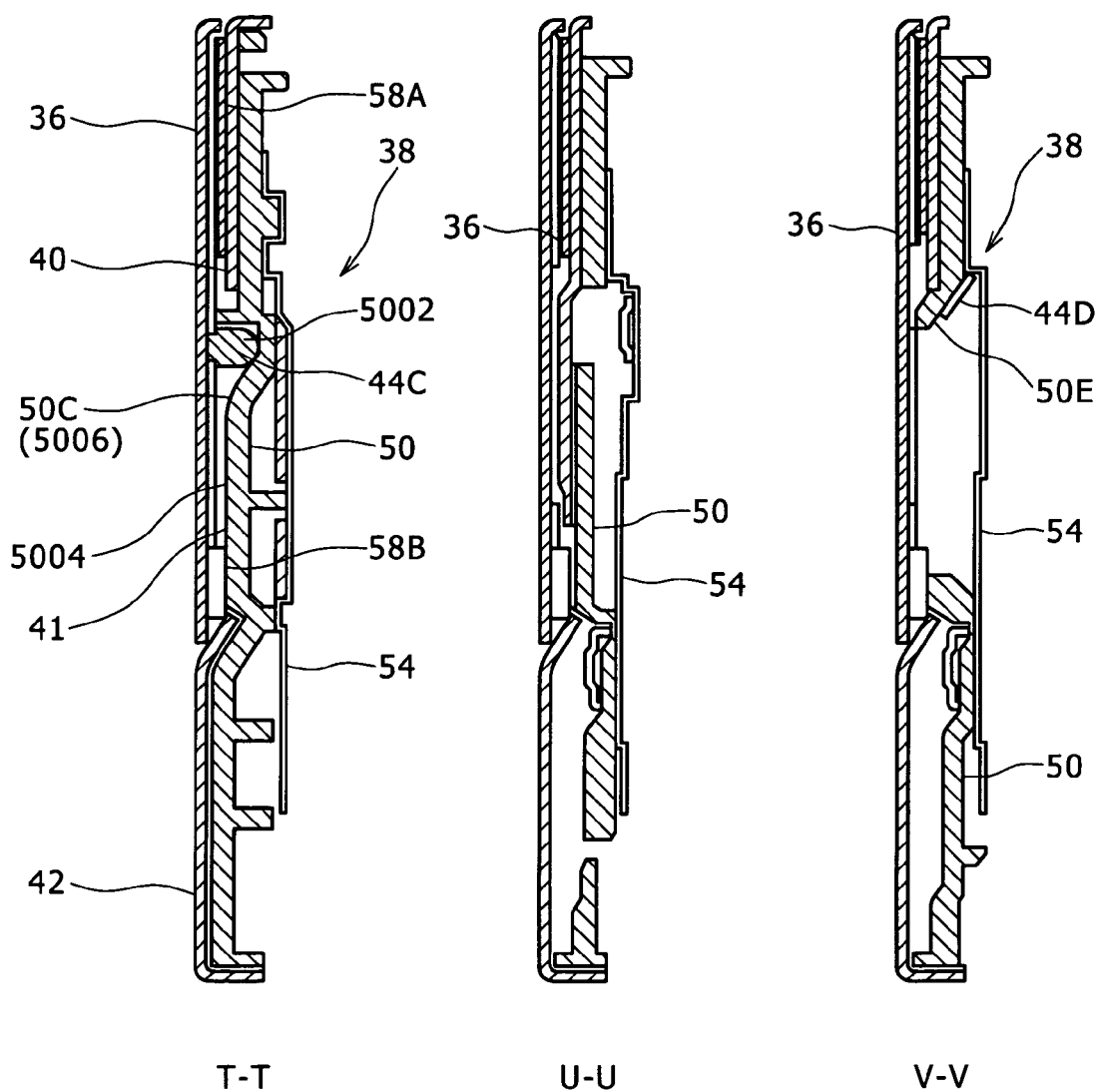
FIG. 15T is a cross sectional view taken along the line TT of FIG. 14A.
FIG. 15U is a cross sectional view taken along the line UU of FIG. 14A.
FIG. 15V is a cross sectional view taken along the line VV of FIG. 14A.

As shown in FIGS. 15T, 15V, and 16W, the support mechanism 38 supports the cover 36 so as to be movable between the close position P1 and the open position P2. The support mechanism 38 includes two first contact members 44C, one second contact member 48G, two third contact members 44D, a first guide face 50C, a second guide face 50D, a third guide face 50E, and an oscillation regulating mechanism.

Figure 4:
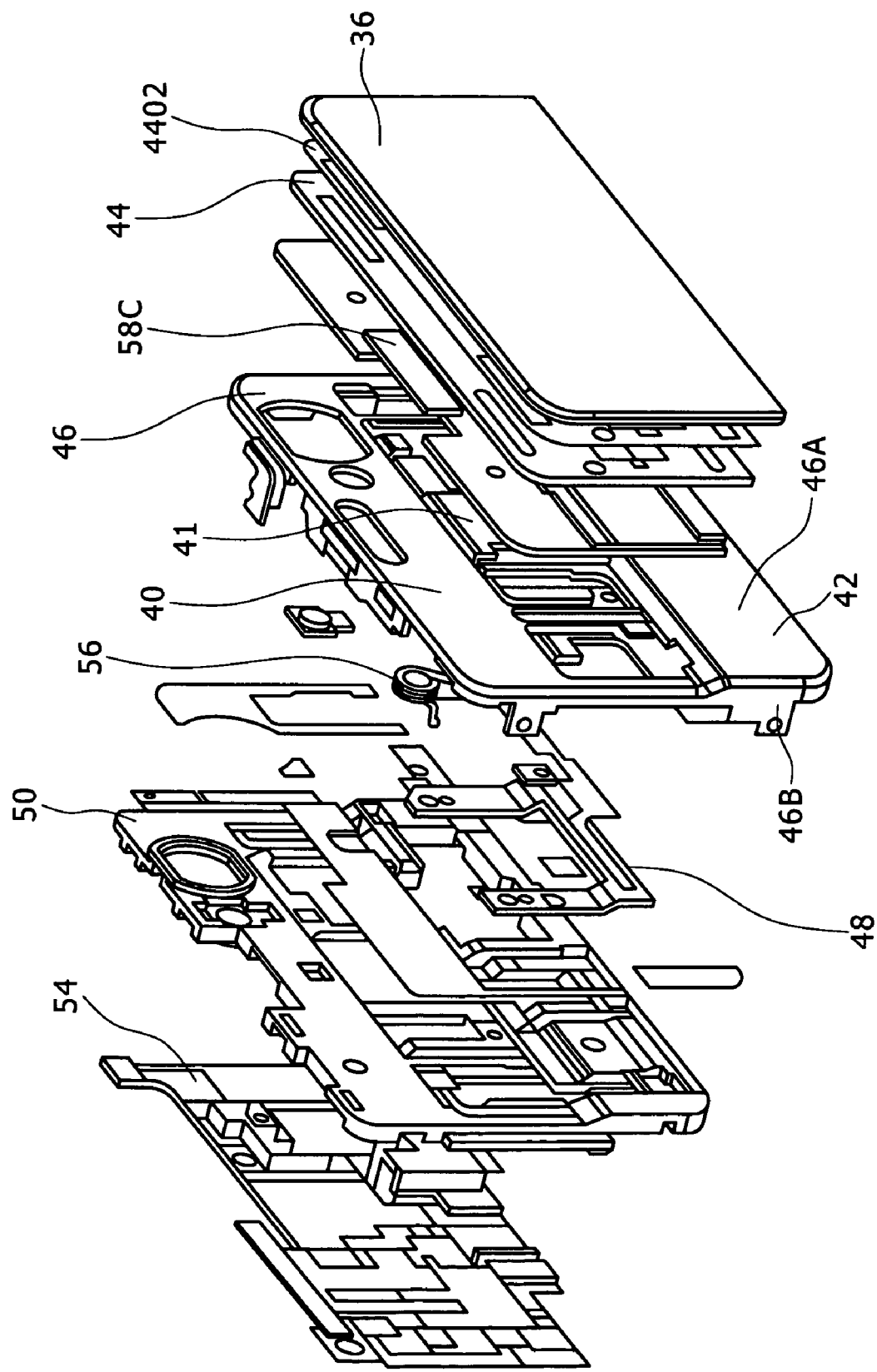
FIG. 4 is an exploded perspective view showing a front part and the cover 36 of a housing 12.
Figure 5:
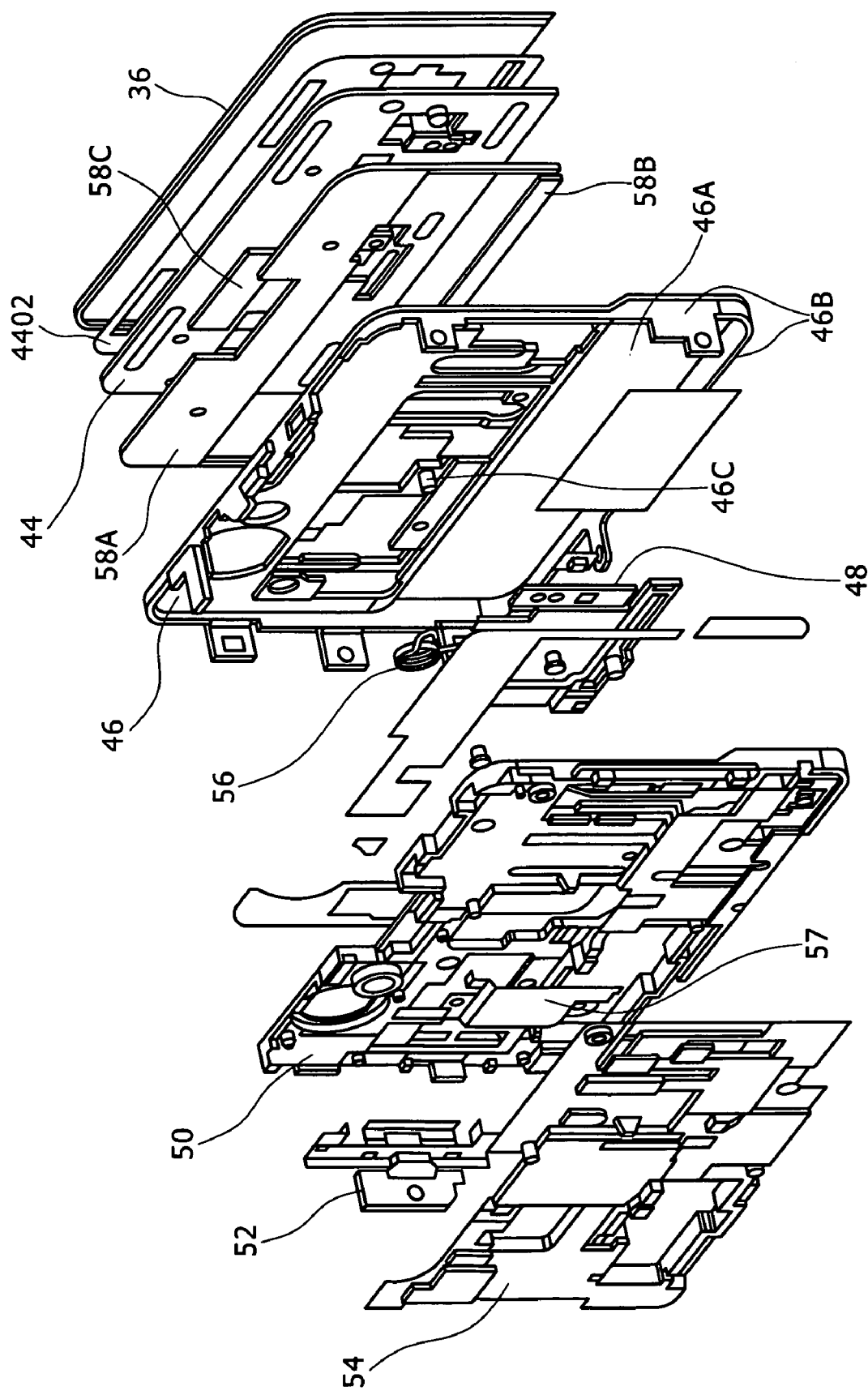
FIG. 5 is another exploded perspective view showing a front part and the cover 36 of the housing 12.

To be more specific, FIGS. 4 and 5 provide perspective views showing a front part and the cover 36 of the housing 12.

The front part of the housing 12 includes an outer cabinet 46, an inner cabinet 50, and a film 54. The outer cabinet 46 includes the front face 14. The inner cabinet 50 is placed at the rear of the outer cabinet 46. The film 54 is placed at the rear of the inner cabinet 50.

A frame 44 and a slider plate 48 are placed at the rear of the cover 36.

As shown in FIGS. 4, 5, 30A, and 30B, the outer cabinet 46 is made of aluminum. The outer cabinet 46 includes a rectangular main plate 46A and four side plates 46B that are raised toward the rear around the main plate 46A.

The front face of the main plate 46A is included in the front face 14 of the housing 12. The side plates 46B form front parts of the top face 18, the bottom face, the left and right side faces 20 and 22 of the housing 12.

As shown in FIGS. 4 and 30, the open/close face 40, the intermediate face 41, and the non-open/close face 42 belong to the front face of the main plate 46A. The intermediate face 41 is hidden by the cover 36 independently of positions of the cover 36.

The non-open/close face 42 is raised from the open/close face 40 as high as the thickness of the cover 36. That is, the non-open/close face 42 is raised toward the front higher than the open/close face 40. The non-open/close face 42 and the open/close face 40 are parallel to each other.

The intermediate face 41 occupies an intermediate position between the open/close face 40 and the non-open/close face 42 in the front-rear direction.

The intermediate face 41 has multiple openings for inserting a first guide pin 44A, two mounting pieces 44B, two first contact members 44C, the one second contact member 48G, the two third contact members 44D, a first latch 44G, a second latch 48D, and a spring latch 48E to be described later.

As shown in FIG. 5, a latch pin 46C protrudes toward the rear at the rear of the intermediate face 41 so as to latch one end of a toggle spring 56.

As shown in FIGS. 4 and 5, the inner cabinet 50 is attached to the rear of the main plate 46A of the outer cabinet 46 with an adhesive.

The rectangular plate-like inner cabinet 50 is sized to be placed inside the main plate 46A and the side plate 46B of the outer cabinet 46. According to the embodiment, the inner cabinet 50 is made of synthetic resin.

As shown in FIG. 31, the inner cabinet 50 includes first and second guide grooves 50A and 50B, and the first, second, and third guide faces 50C, 50D, and 50E.

Figure 6:
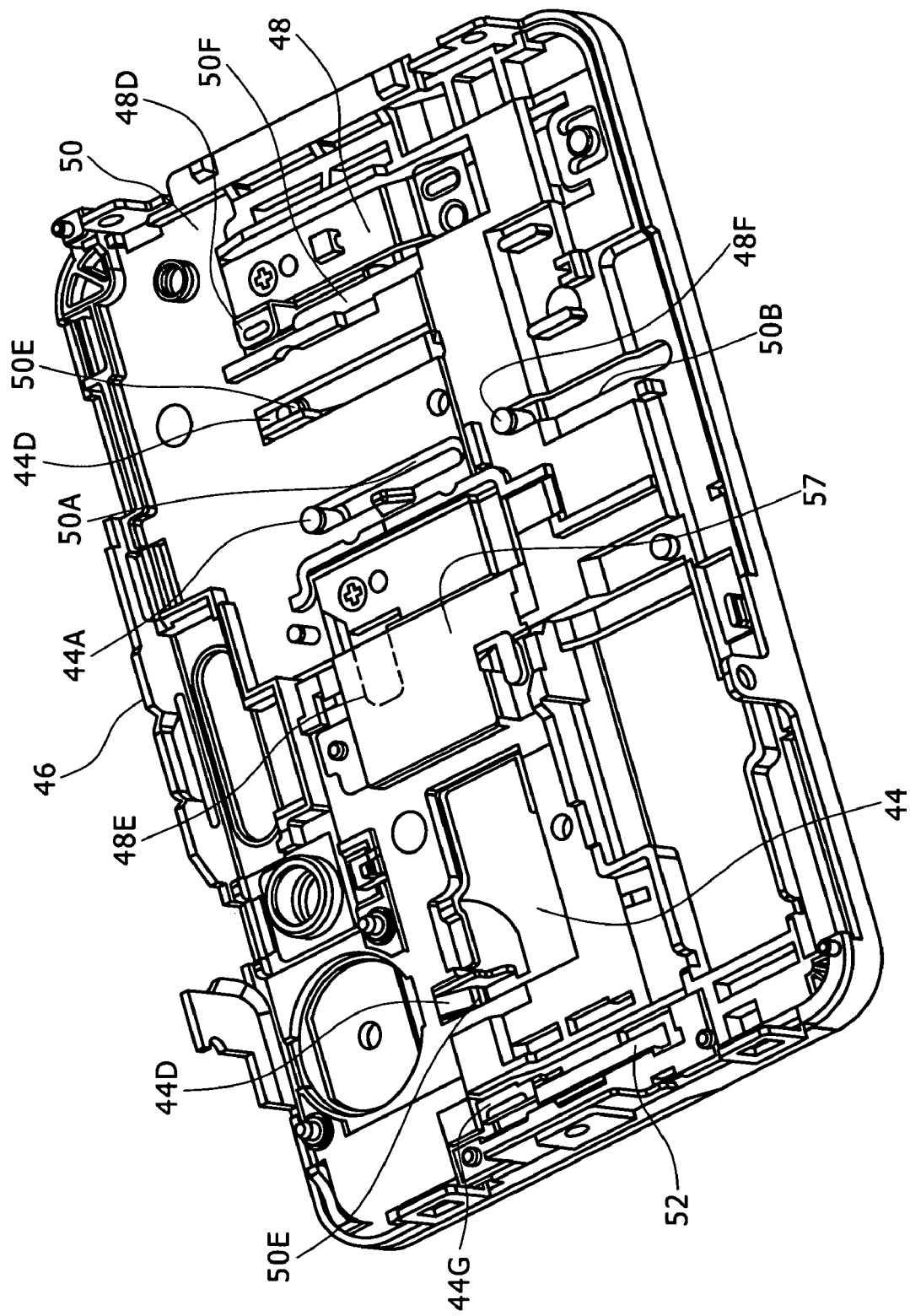
FIG. 6 is a perspective view of the front part of the housing 12 viewed from the rear.

As shown in FIG. 6, the first and second guide grooves 50A and 50B are provided at two locations with an interval along the same line as the direction of moving the cover 36. First and second guide pins 44A and 48F are respectively inserted into the first and second guide grooves 50A and 50B to guide the frame 44 and the cover 36 in the direction of moving the cover 36. The close position P1 is determined when the first and second guide pins 44A and 48F stop at one ends of the first and second guide grooves 50A and 50B along the extending directions. The open position P2 is determined when the first and second guide pins 44A and 48F stop at the other ends of the first and second guide grooves 50A and 50B along the extending directions. There may be provided one guide pin and one guide groove. As described in the embodiment, the use of two guide pins and two guide grooves is advantageous for smoothly moving the cover.

Figure 7:
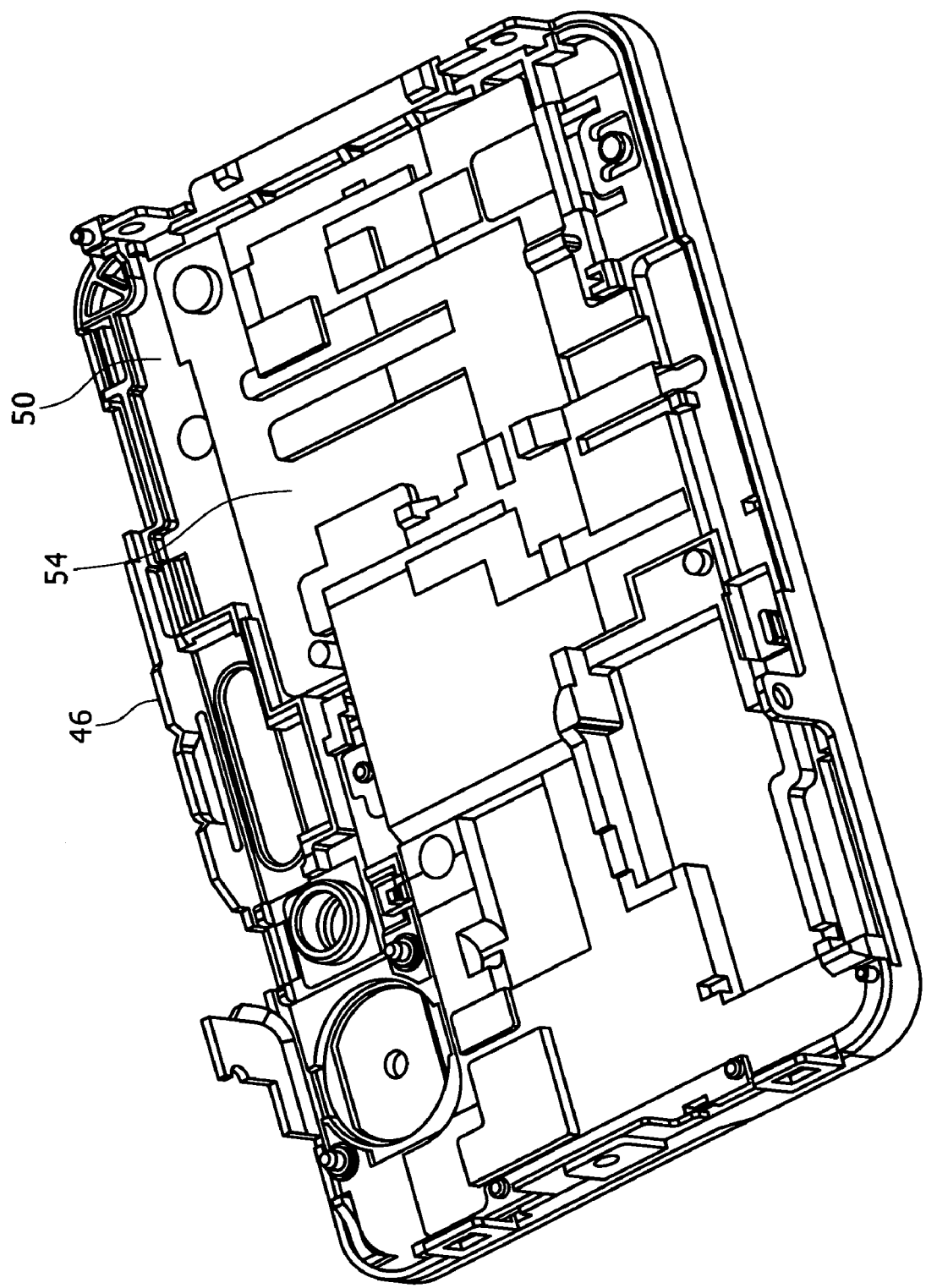
FIG. 7 is a perspective view showing a film 54 covering a face against the rear of the front part of the housing 12.
Figure 8:
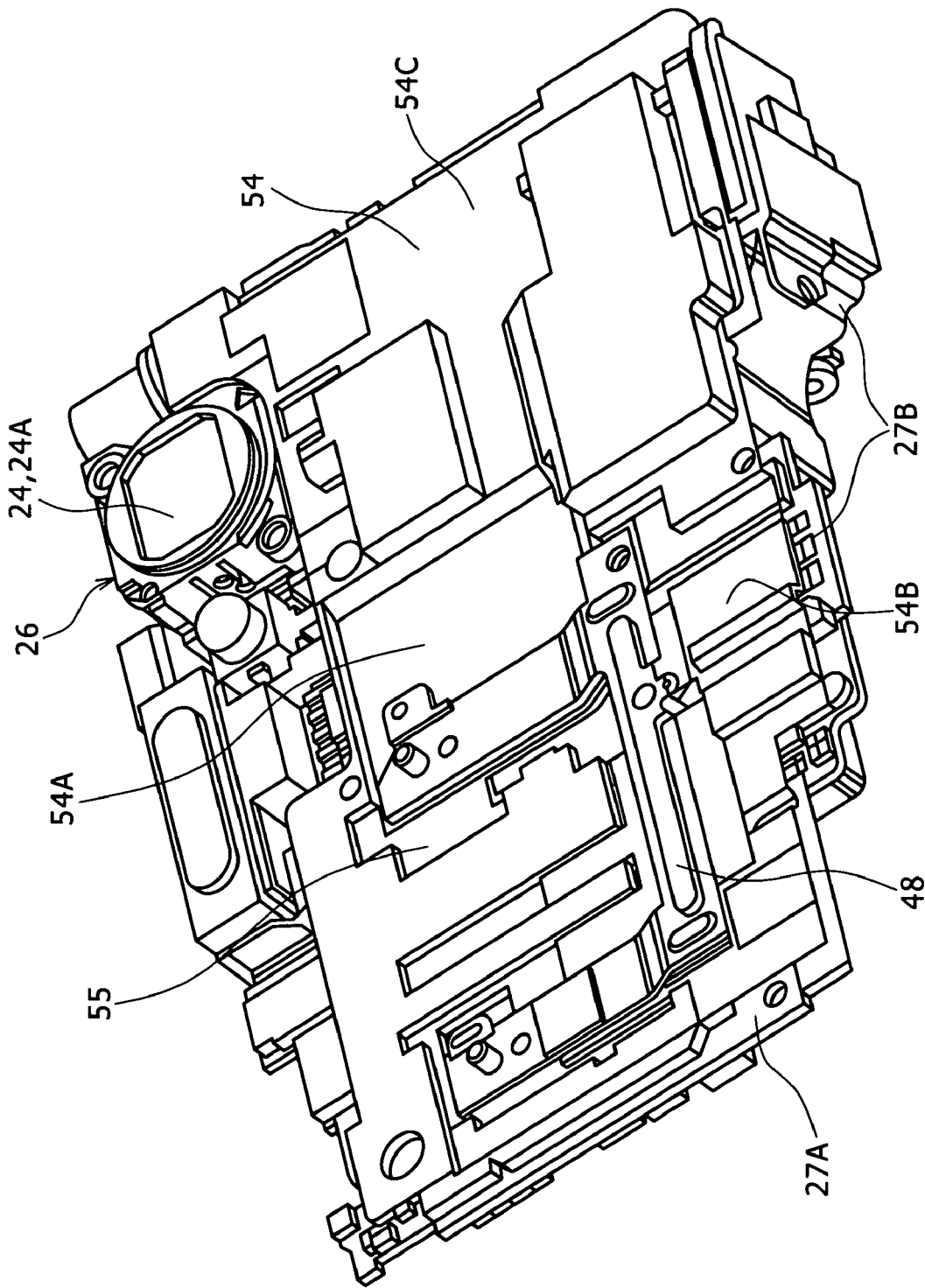
FIG. 8 is a perspective view showing the film 54 covering a face against an inner cabinet 50, wherein the face corresponds to a lens barrel 26 and an electronic part 27 mounted toward the rear of the inner cabinet 50.

FIG. 6 is a perspective view of the front part of the housing 12 viewed from the rear. FIG. 7 is a perspective view showing the film 54 covering a face against the rear of the front part of the housing 12. FIG. 8 is a perspective view showing the film 54 covering a face against the inner cabinet 50, wherein the face corresponds to the lens barrel 26 and an electronic part 27 mounted toward the rear of the inner cabinet 50.

Figure 9:
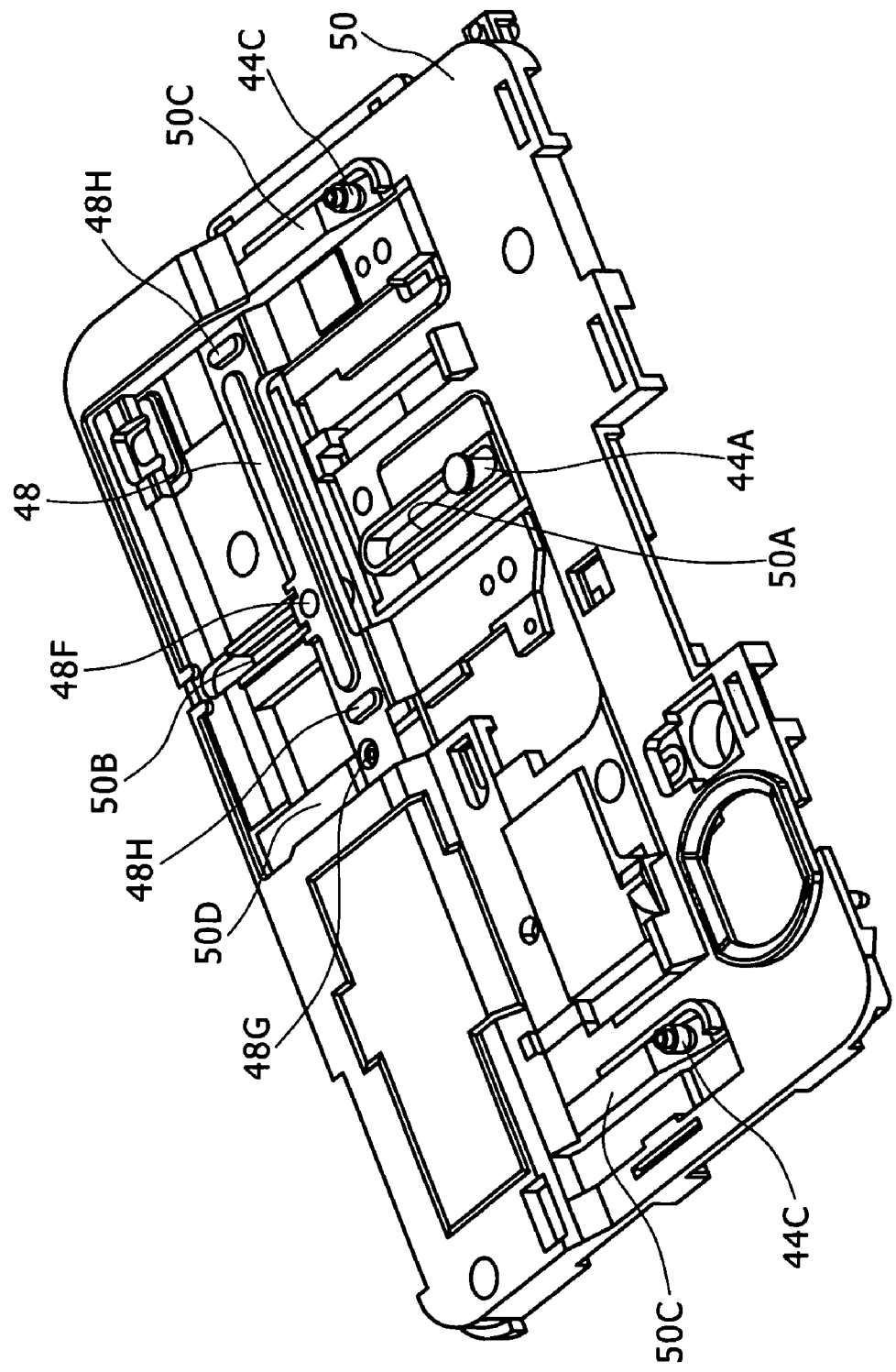
FIG. 9 is a perspective view of the housing 12 viewed from the front by excluding an outer cabinet 46 from the front part of the housing 12.
Figure 10:
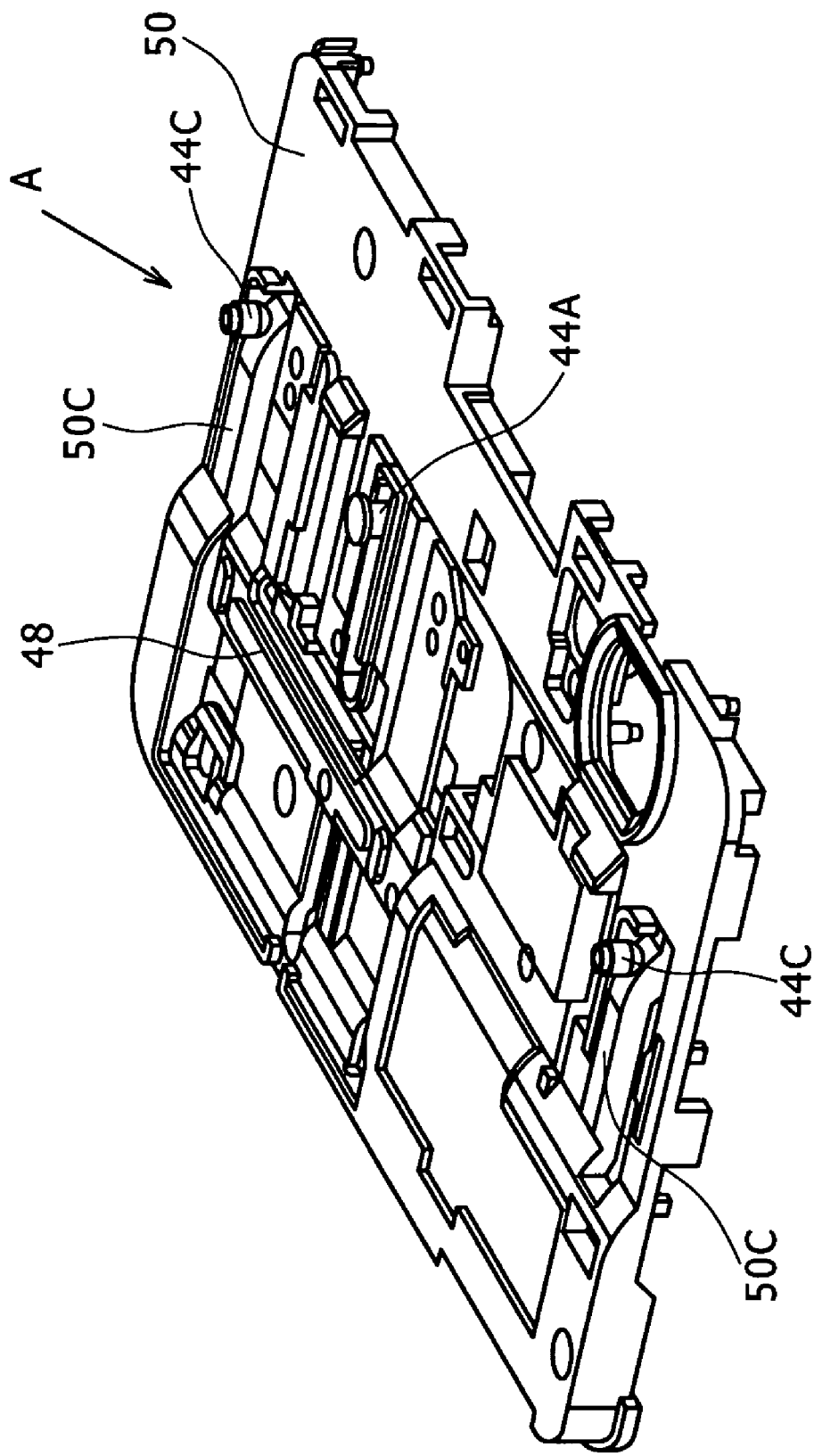
FIG. 10 is another perspective view of the housing 12 viewed from the front by excluding an outer cabinet 46 from the front part of the housing 12.
Figure 11:
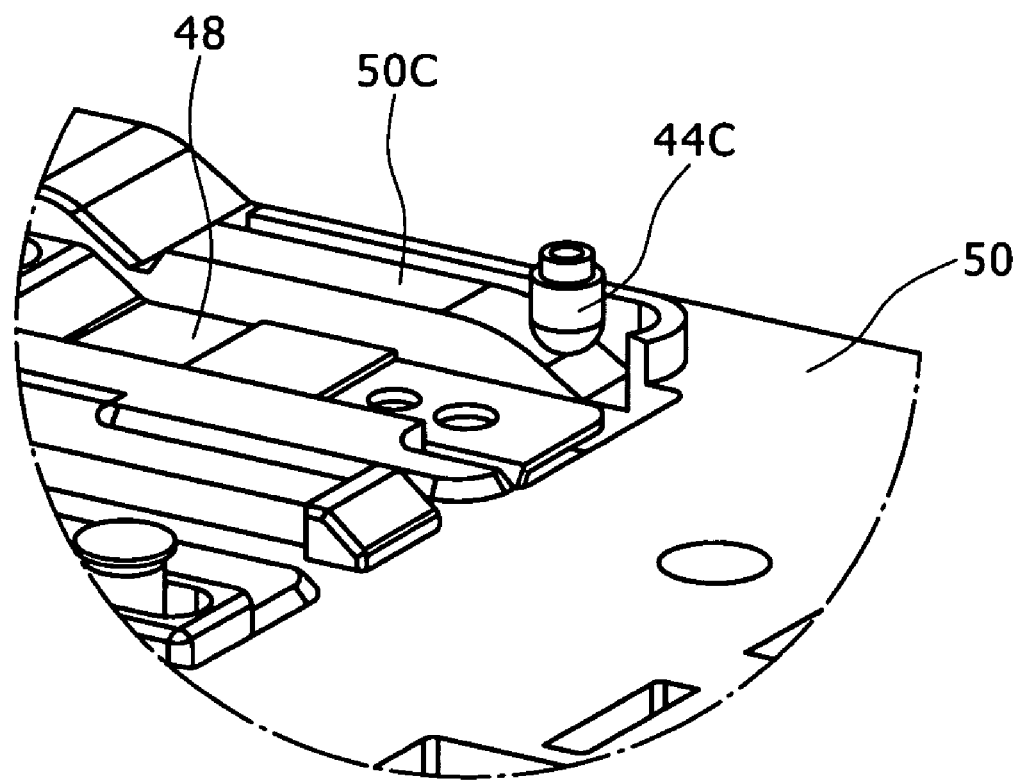
FIG. 11 is a perspective view by enlarging part A in FIG. 10.
Figure 12:
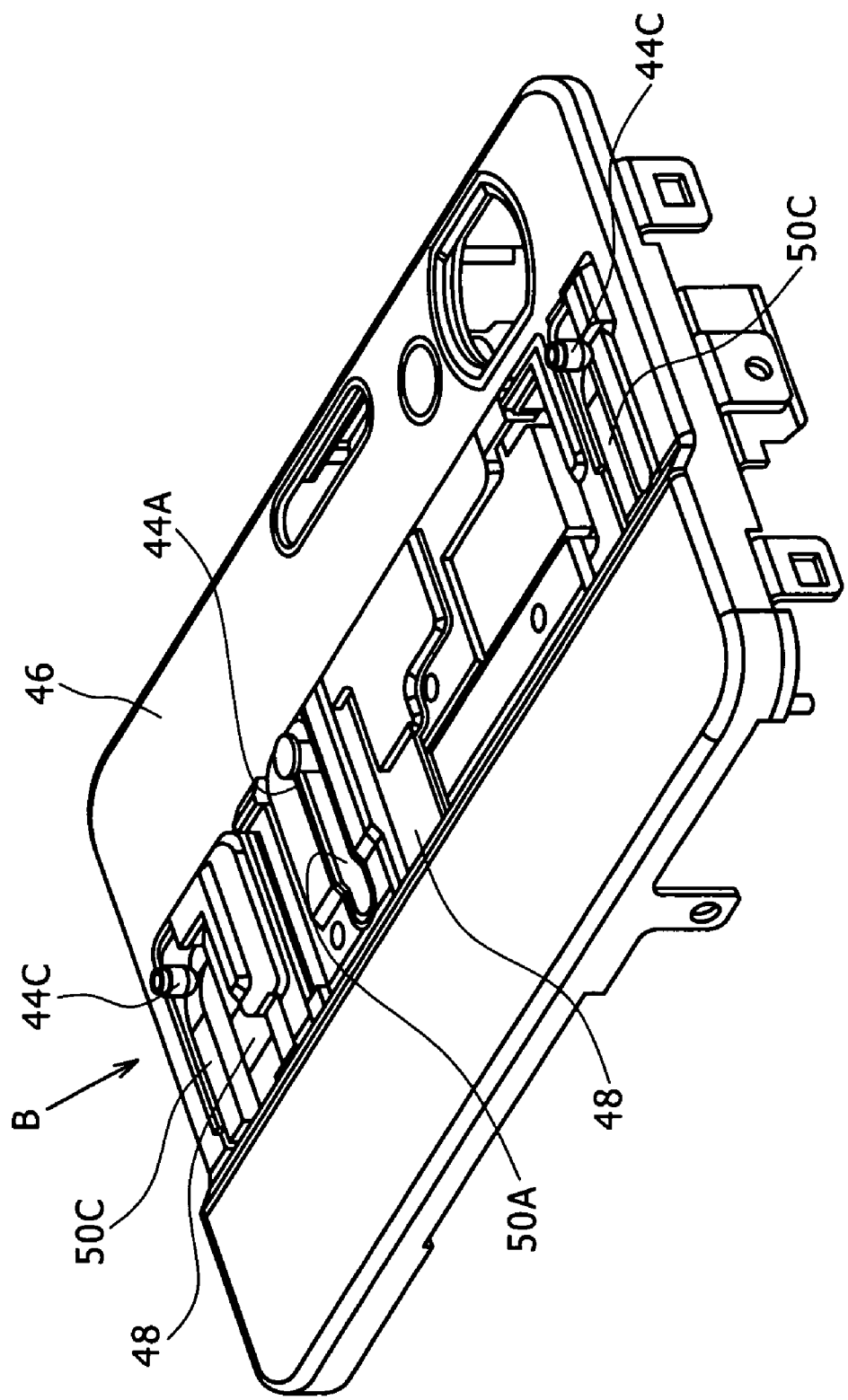
FIG. 12 is still another perspective view of the housing 12 viewed from the front by excluding an outer cabinet 46 from the front part of the housing 12.
Figure 13:
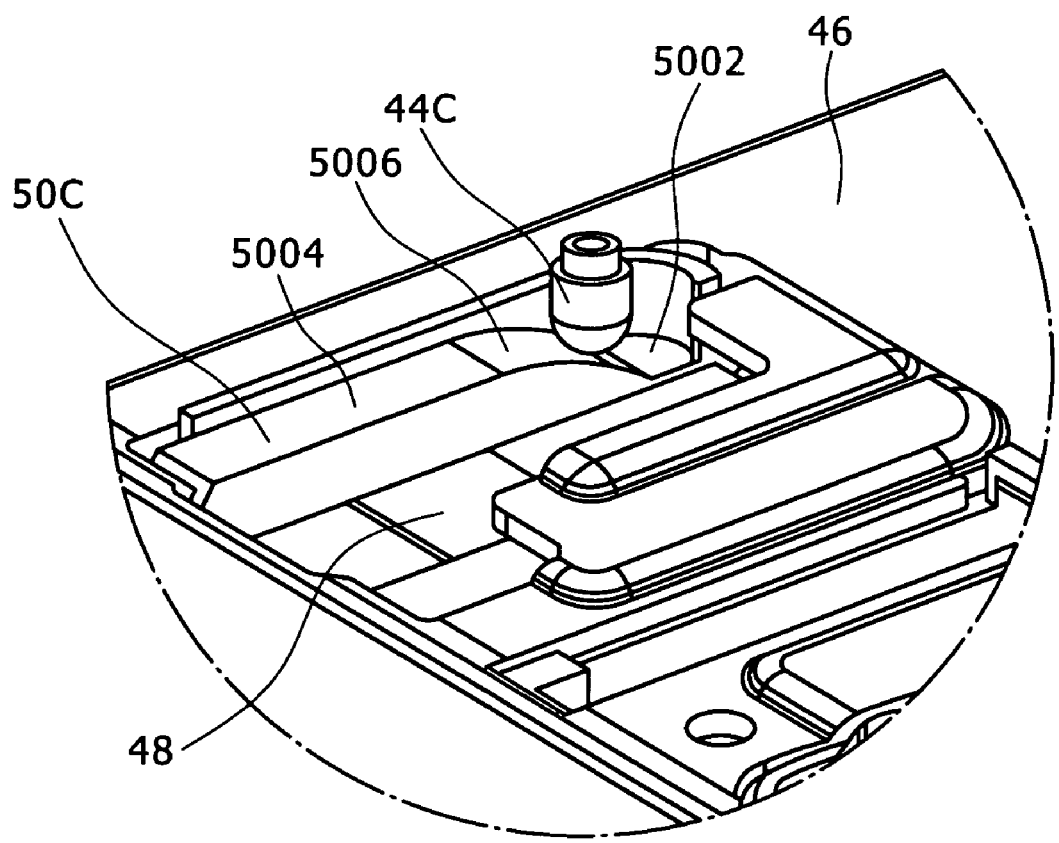
FIG. 13 is another perspective view by enlarging part B in FIG. 12.

FIGS. 9, 10, and 12 are perspective views of the housing 12 viewed from the front by excluding the outer cabinet 46 from the front part of the housing 12. FIG. 11 is a perspective view by enlarging part A in FIG. 10. FIG. 13 is another perspective view by enlarging part B in FIG. 12.

Figure 17A:
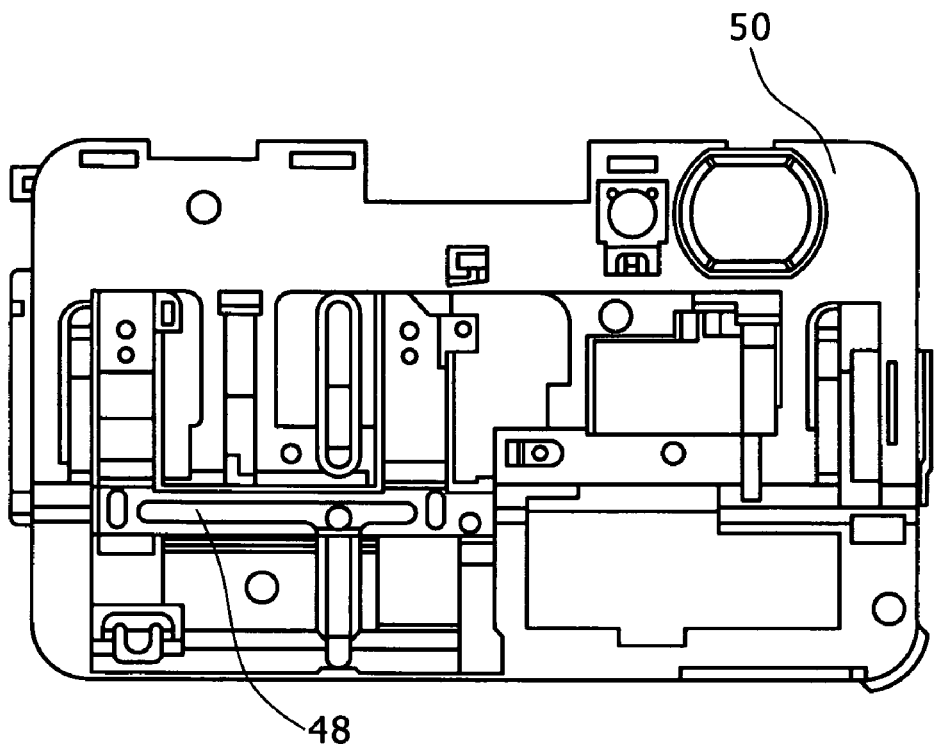
FIG. 17A is a front view showing positional relation between the inner cabinet 50 and a slider plate 48 with the cover 36 positioned at the close position P1 viewed from the front.
Figure 17B:
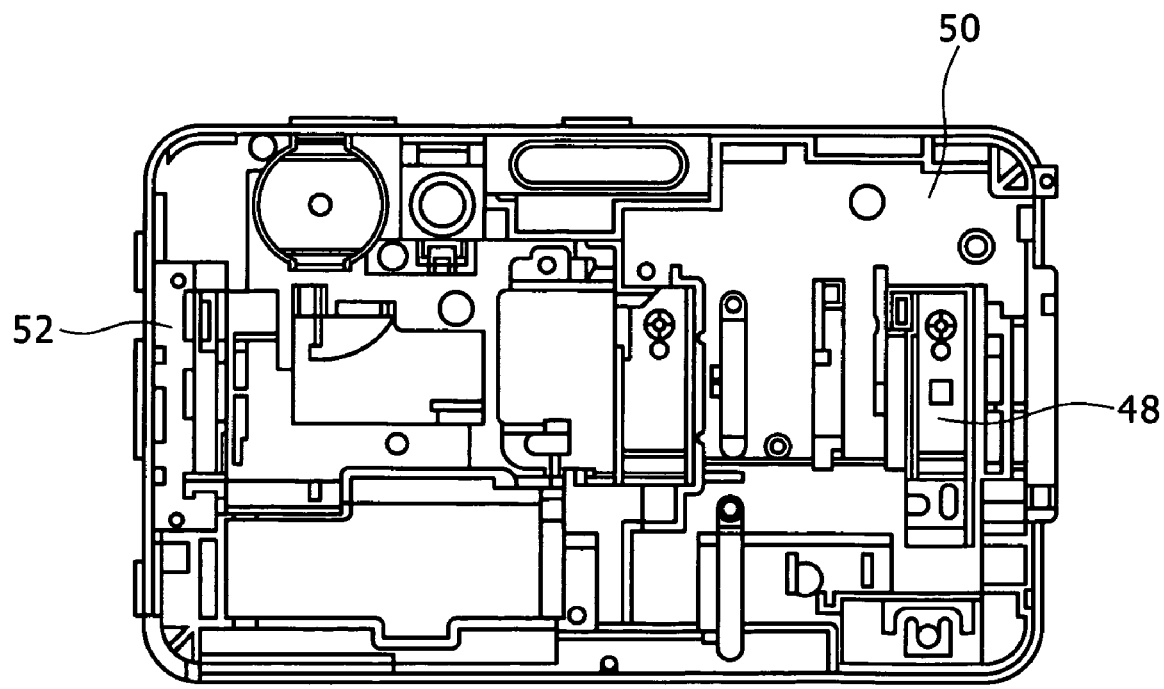
FIG. 17B is a rear view showing positional relation between the inner cabinet 50 and the slider plate 48 with the cover 36 positioned at the close position P1 viewed from the rear.

FIG. 14A is a front view showing the cover 36 positioned at the close position P1. FIG. 14B is a side view of FIG. 4A viewed along an arrow B. FIG. 14C is a side view of FIG. 4A viewed along an arrow C. FIG. 15T is a cross sectional view taken along the line TT of FIG. 14A. FIG. 15U is a cross sectional view taken along the line UU of FIG. 14A. FIG. 15V is a cross sectional view taken along the line VV of FIG. 14A. FIG. 16W is a cross sectional view taken along the line WW of FIG. 14A. FIG. 16X is a cross sectional view taken along the line XX of FIG. 14A. FIG. 17A is a front view showing positional relation between the inner cabinet 50 and the slider plate 48 with the cover 36 positioned at the close position P1 viewed from the front. FIG. 17B is a rear view showing positional relation between the inner cabinet 50 and the slider plate 48 with the cover 36 positioned at the close position P1 viewed from the rear.

Figures 19F, 19G, 19I:
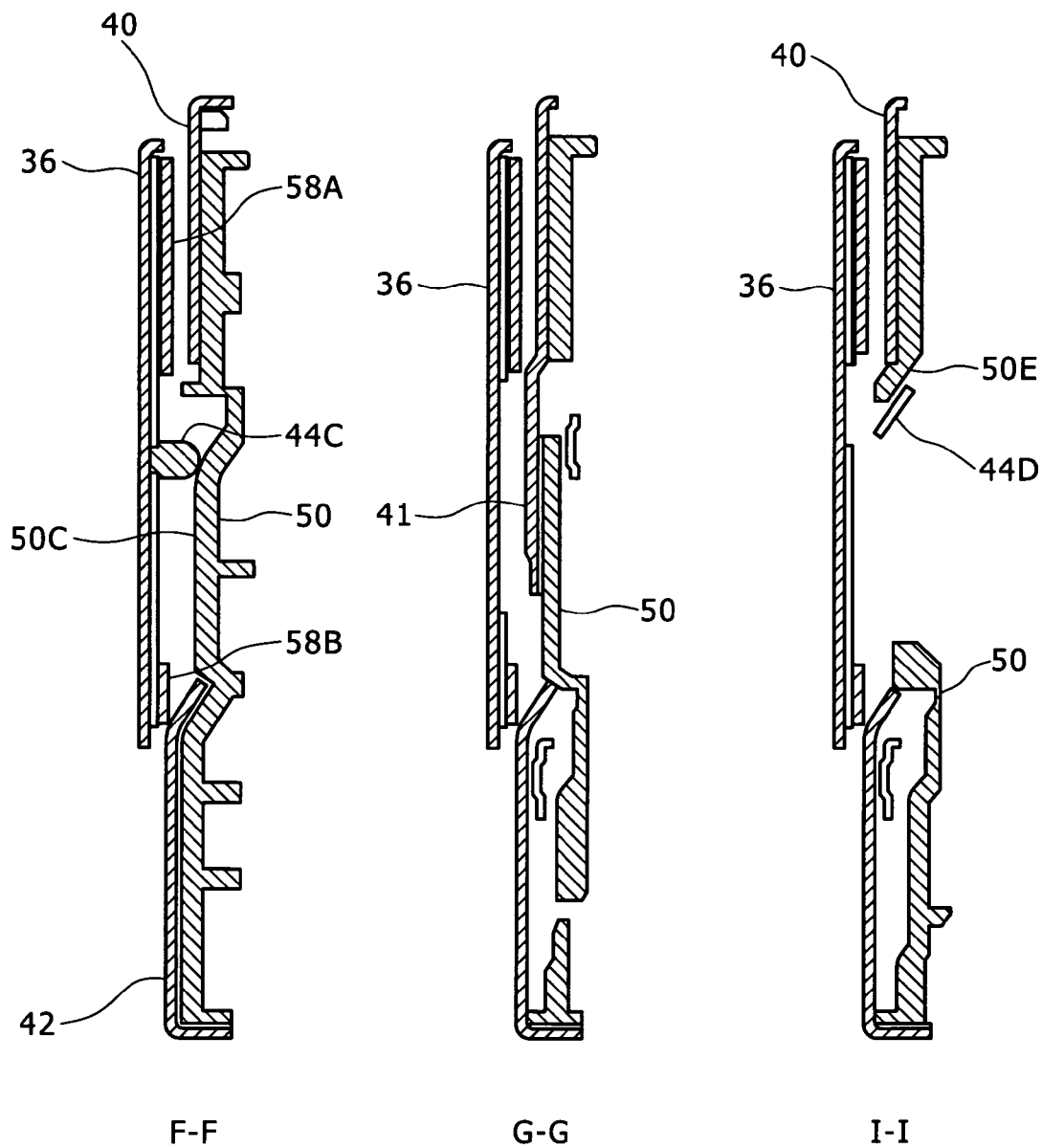
FIG. 19F is a cross sectional view taken along the line FF of FIG. 18A.
FIG. 19G is a cross sectional view taken along the line GG of FIG. 18A.
FIG. 19I is a cross sectional view taken along the line II of FIG. 18A.
Figure 20R:
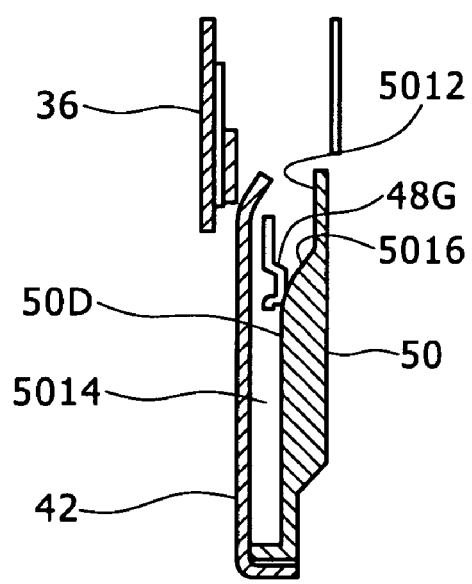
FIG. 20R is a cross sectional view taken along the line RR of FIG. 18A.
Figure 20S:
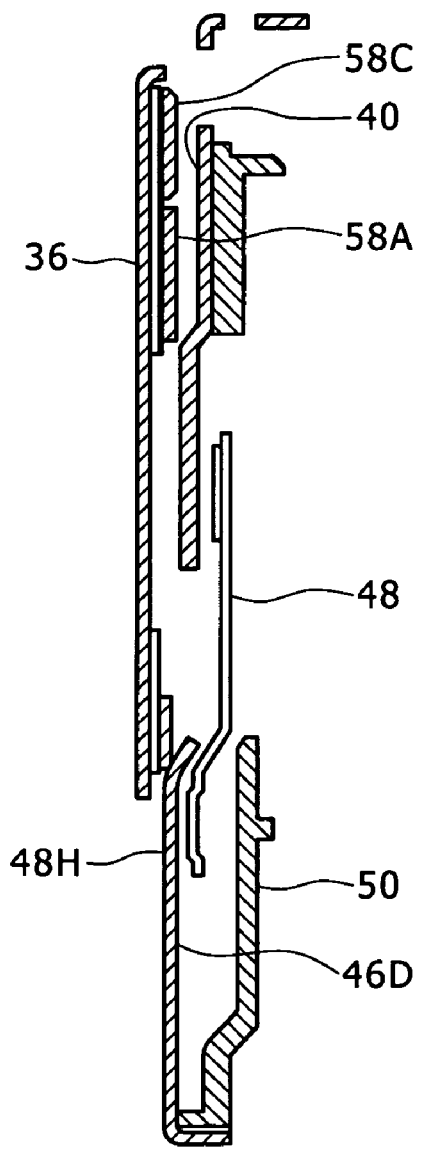
FIG. 20S is a cross sectional view taken along the line SS of FIG. 18A.
Figure 21A:
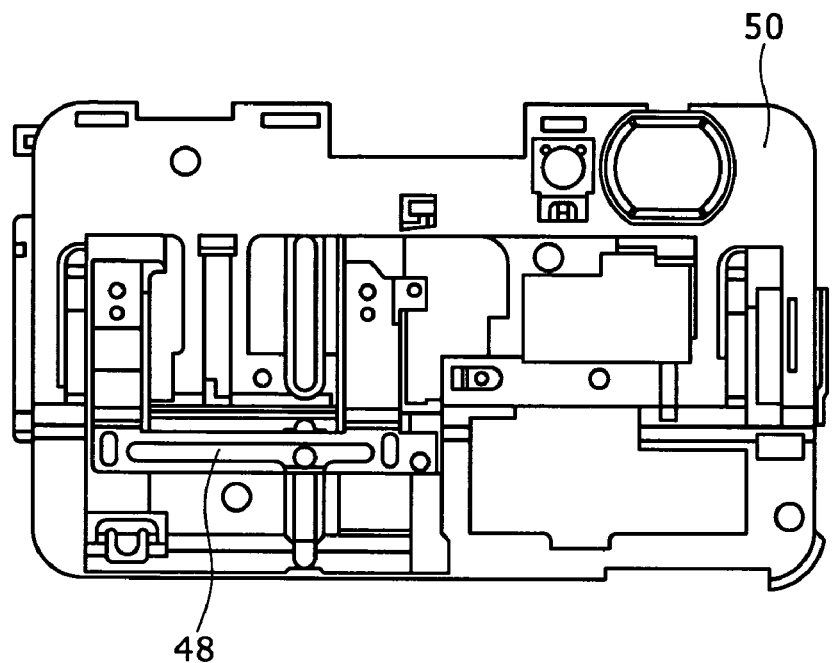
FIG. 21A is a front view showing positional relation between the inner cabinet 50 and the slider plate 48 with the cover 36 moving from the close position P1 to the open position P2 viewed from the front.
Figure 21B:
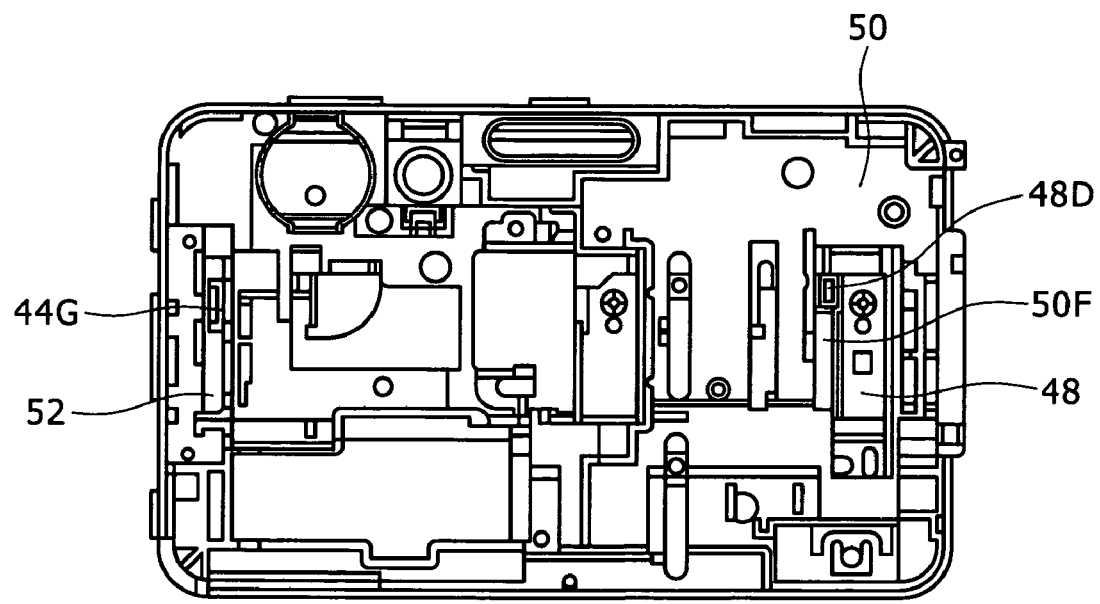
FIG. 21B is a rear view showing positional relation between the inner cabinet 50 and the slider plate 48 with the cover 36 moving from the close position P1 to the open position P2 viewed from the rear.

FIG. 18A is a front view showing the cover 36 moving from the close position P1 to the open position P2. FIG. 18B is a side view of FIG. 18A viewed along an arrow B. FIG. 18C is a side view of FIG. 18A viewed along an arrow C. FIG. 19F is a cross sectional view taken along the line FF of FIG. 18A. FIG. 19G is a cross sectional view taken along the line GG of FIG. 18A. FIG. 19I is a cross sectional view taken along the line II of FIG. 18A. FIG. 20R is a cross sectional view taken along the line RR of FIG. 18A. FIG. 20S is a cross sectional view taken along the line SS of FIG. 18A. FIG. 21A is a front view showing positional relation between the inner cabinet 50 and the slider plate 48 with the cover 36 moving from the close position P1 to the open position P2 viewed from the front. FIG. 21B is a rear view showing positional relation between the inner cabinet 50 and the slider plate 48 with the cover 36 moving from the close position P1 to the open position P2 viewed from the rear.

Figure 23J:
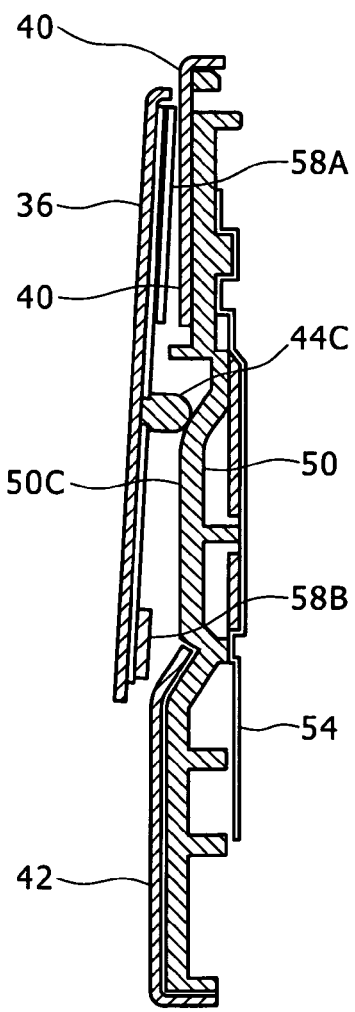
FIG. 23J is a cross sectional view taken along the line JJ of FIG. 22A.
Figure 23K:
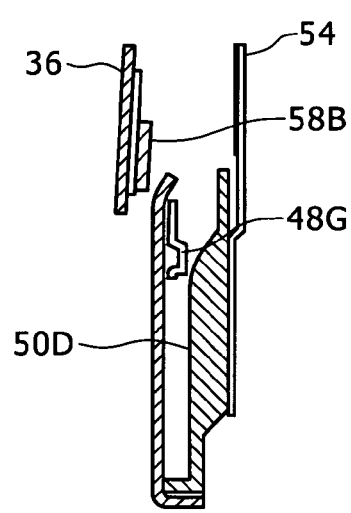
FIG. 23K is a cross sectional view taken along the line KK of FIG. 22A.
Figure 23L:
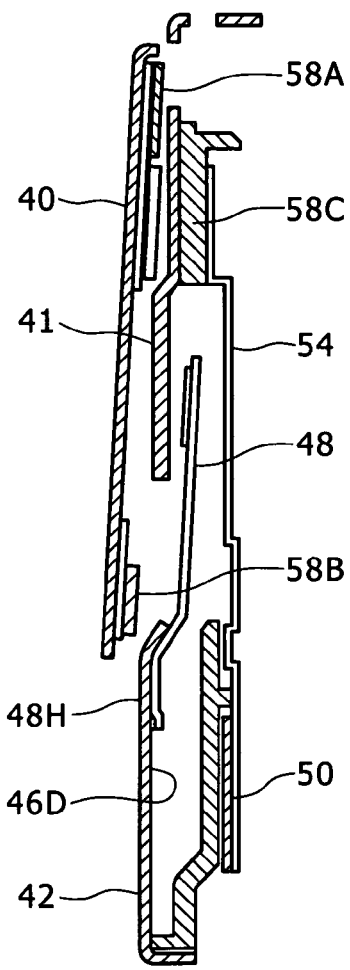
FIG. 23L is a cross sectional view taken along the line LL of FIG. 22A.

FIG. 22A is a front view showing the cover 36 moving from the close position P1 to the open position P2 while the cover 36 is pressed toward the rear. FIG. 22B is a side view of FIG. 22A viewed along an arrow B. FIG. 22C is a side view of FIG. 22A viewed along an arrow C. FIG. 23J is a cross sectional view taken along the line JJ of FIG. 22A. FIG. 23K is a cross sectional view taken along the line KK of FIG. 22A. FIG. 23L is a cross sectional view taken along the line LL of FIG. 22A.

Figures 25D, 25E, 25H:
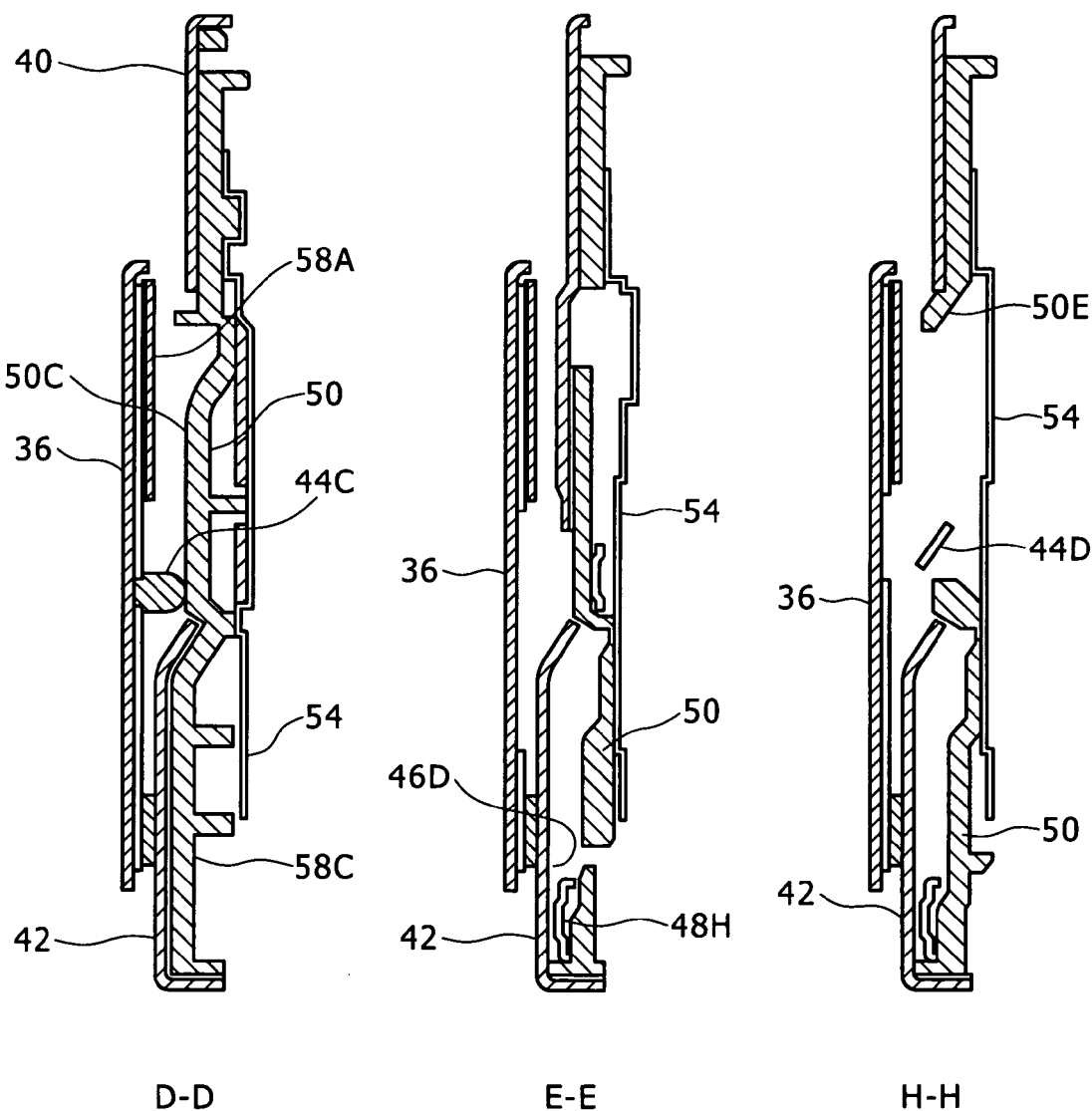
FIG. 25D is a cross sectional view taken along the line DD of FIG. 24A.
FIG. 25E is a cross sectional view taken along the line EE of FIG. 24A.
FIG. 25H is a cross sectional view taken along the line HH of FIG. 24A.
Figure 26Q:
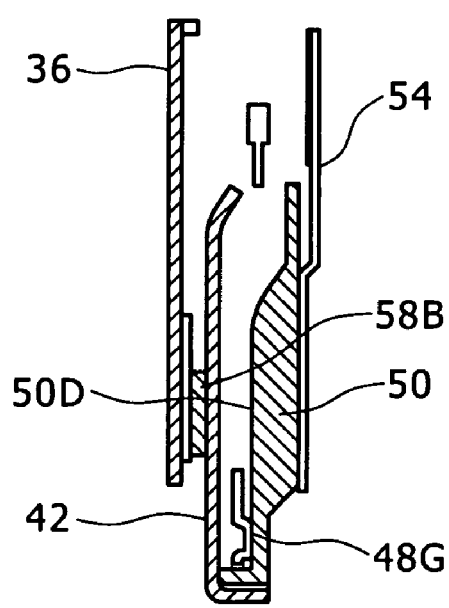
FIG. 26Q is a cross sectional view taken along the line QQ of FIG. 24A.
Figure 26Y:
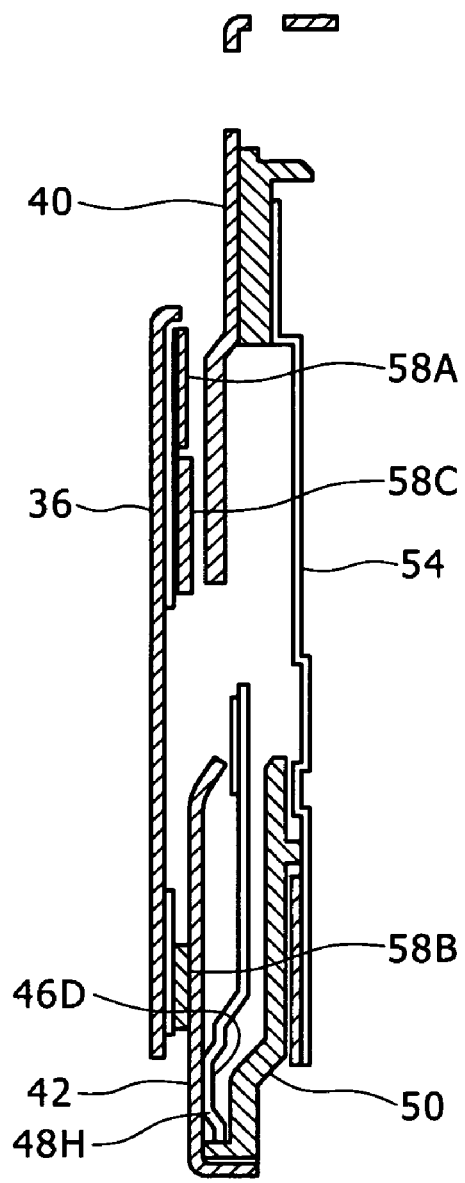
FIG. 26Y is a cross sectional view taken along the line YY of FIG. 24A.
Figure 27A:
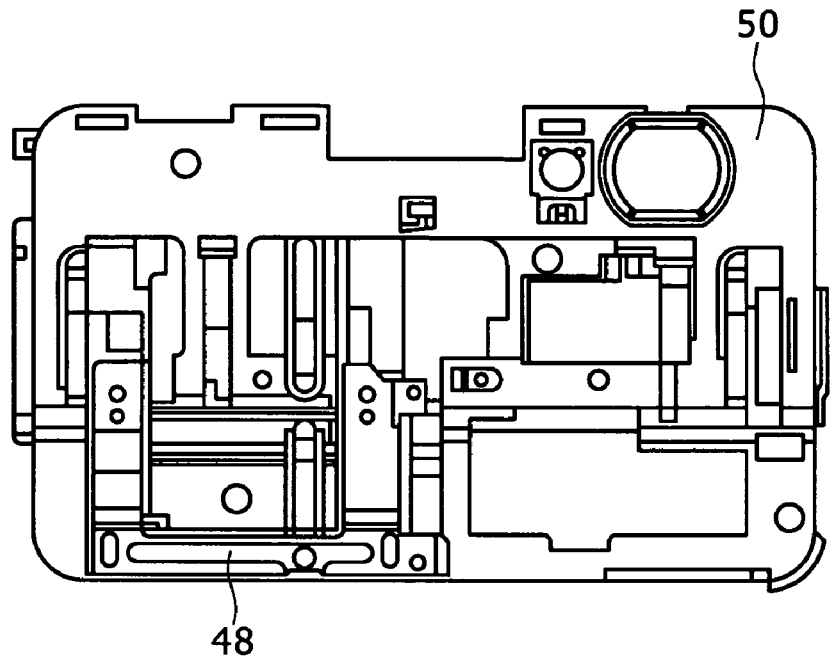
FIG. 27A is a front view showing positional relation between the inner cabinet 50 and the slider plate 48 with the cover 36 positioned at the open position P2 viewed from the front.
Figure 27B:
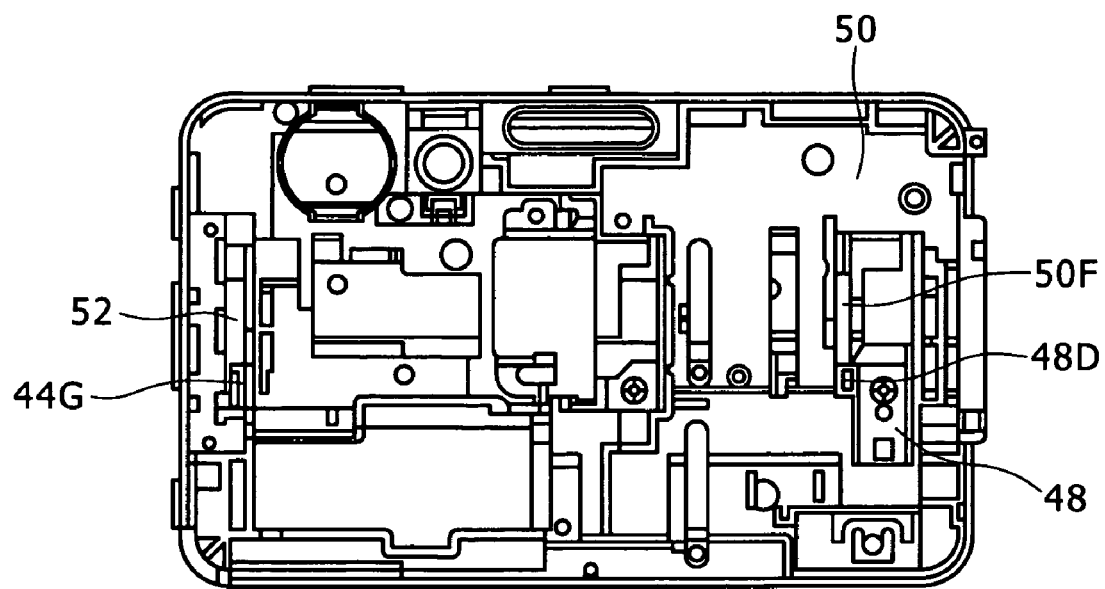
FIG. 27B is a rear view showing positional relation between the inner cabinet 50 and the slider plate 48 with the cover 36 positioned at the open position P2 viewed from the rear.

FIG. 24A is a front view showing the cover 36 positioned at the open position P2. FIG. 24B is a side view of FIG. 24A viewed along an arrow B. FIG. 24C is a side view of FIG. 24A viewed along an arrow C. FIG. 25D is a cross sectional view taken along the line DD of FIG. 24A. FIG. 25E is a cross sectional view taken along the line EE of FIG. 24A. FIG. 25H is a cross sectional view taken along the line HH of FIG. 24A. FIG. 26Q is a cross sectional view taken along the line QQ of FIG. 24A. FIG. 26Y is a cross sectional view taken along the line YY of FIG. 24A. FIG. 27A is a front view showing positional relation between the inner cabinet 50 and a slider plate 48 with the cover 36 positioned at the open position P2 viewed from the front. FIG. 27B is a rear view showing positional relation between the inner cabinet 50 and the slider plate 48 with the cover 36 positioned at the open position P2 viewed from the rear.

Figures 29M, 29N, 29O, 29P:
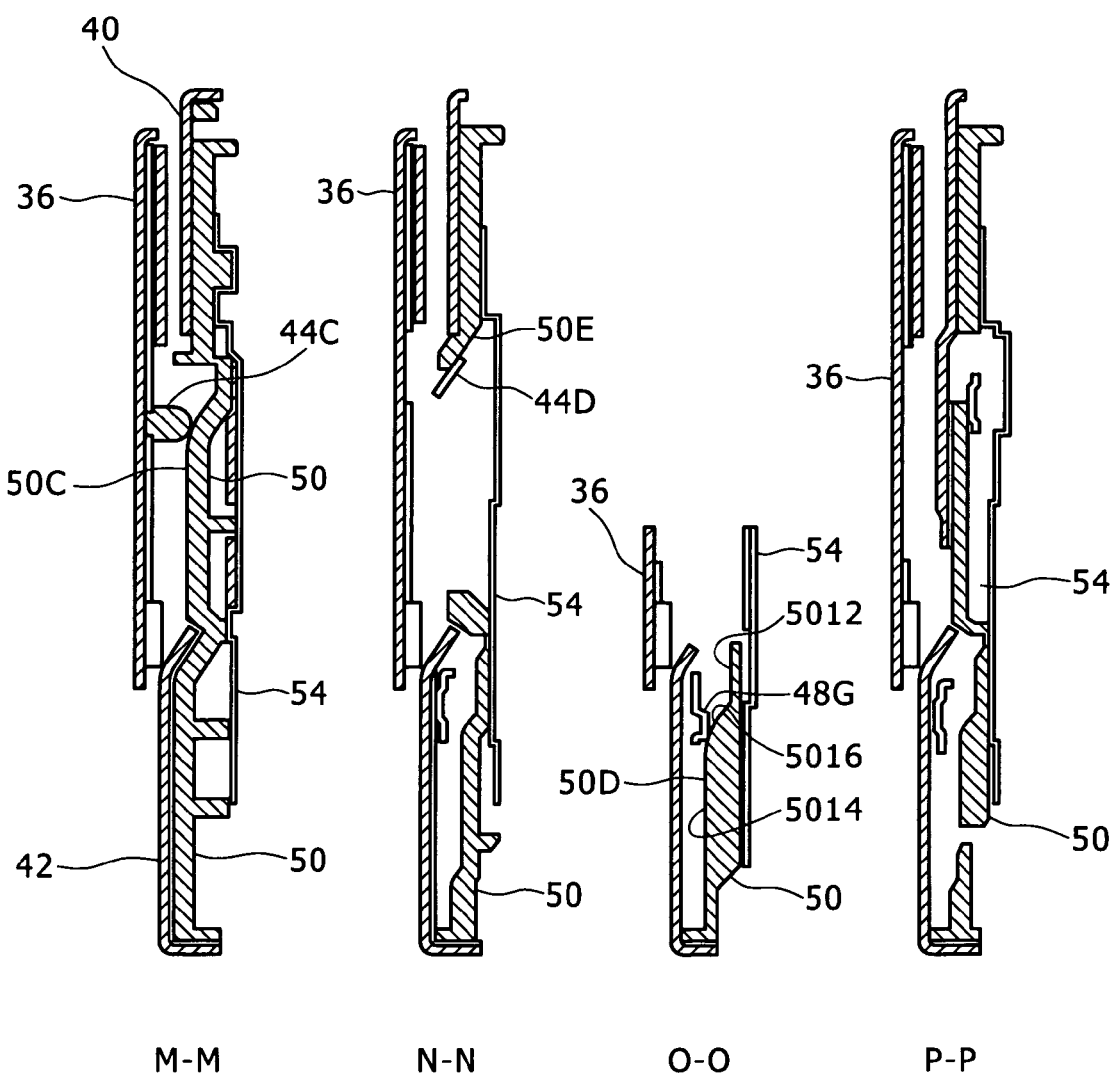
FIG. 29M is a cross sectional view taken along the line MM of FIG. 28A.
FIG. 29N is a cross sectional view taken along the line NN of FIG. 28A.
FIG. 29O is a cross sectional view taken along the line OO of FIG. 28A.
FIG. 29P is a cross sectional view taken along the line PP of FIG. 28A.

FIG. 28A is a front view showing the cover 36 positioned immediately before the close position P1. FIG. 28B is a side view of FIG. 28A viewed along an arrow B. FIG. 28C is a side view of FIG. 28A viewed along an arrow C. FIG. 29M is a cross sectional view taken along the line MM of FIG. 28A. FIG. 29N is a cross sectional view taken along the line NN of FIG. 28A. FIG. 29O is a cross sectional view taken along the line OO of FIG. 28A. FIG. 29P is a cross sectional view taken along the line PP of FIG. 28A.

Figure 30A:
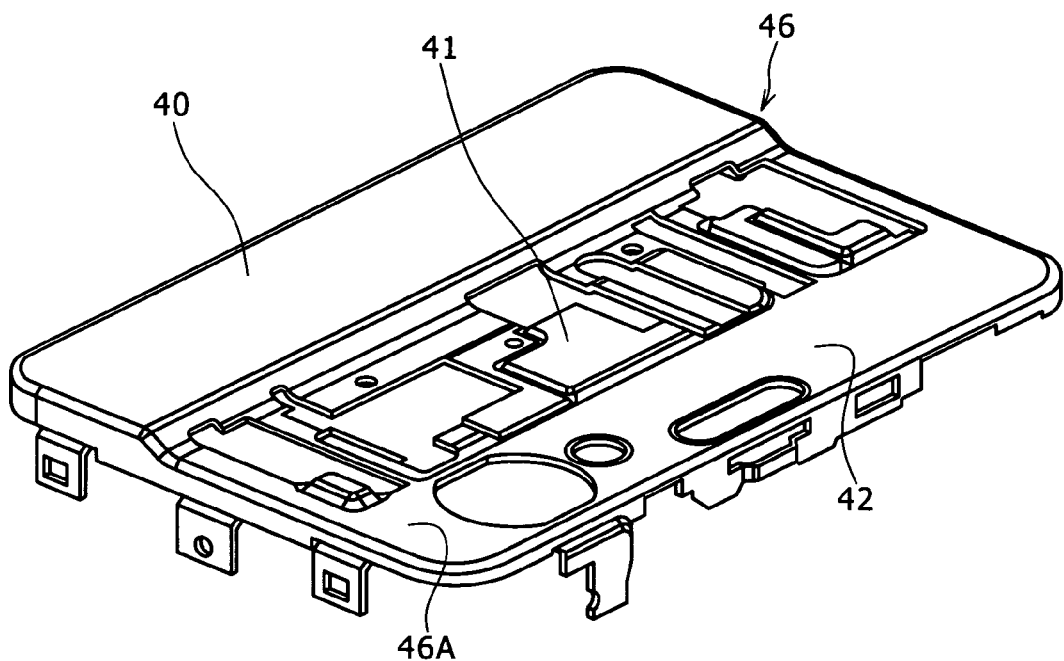
FIG. 30A is a perspective view of the outer cabinet 46.
Figure 30B:
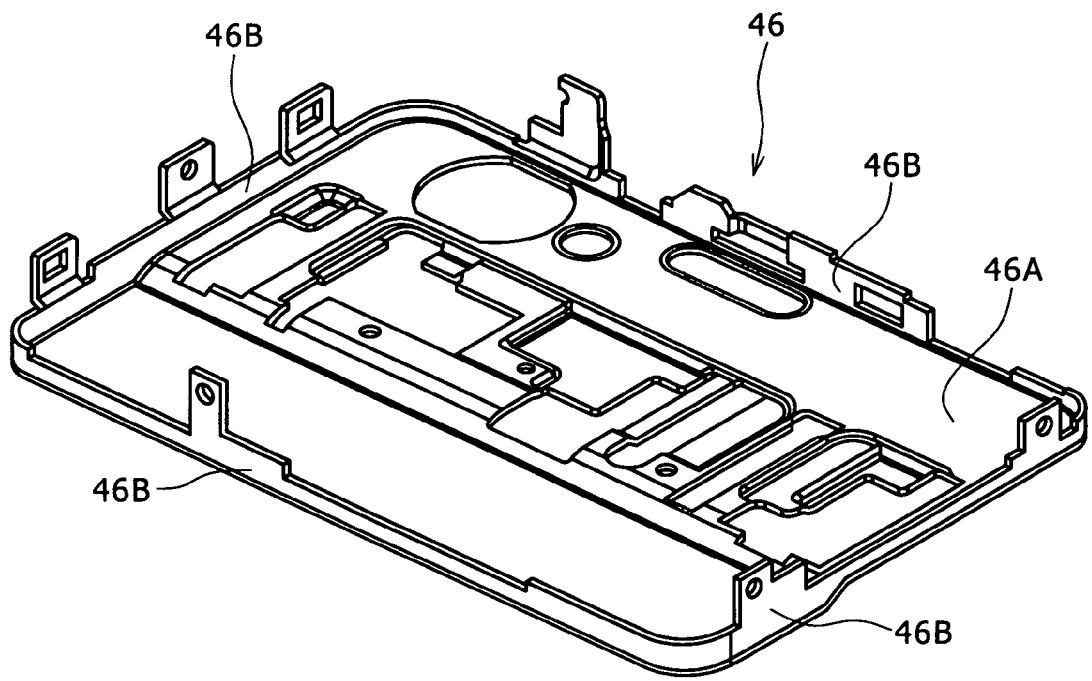
FIG. 30B is a perspective view of the outer cabinet 46 upside down.
Figure 31A:
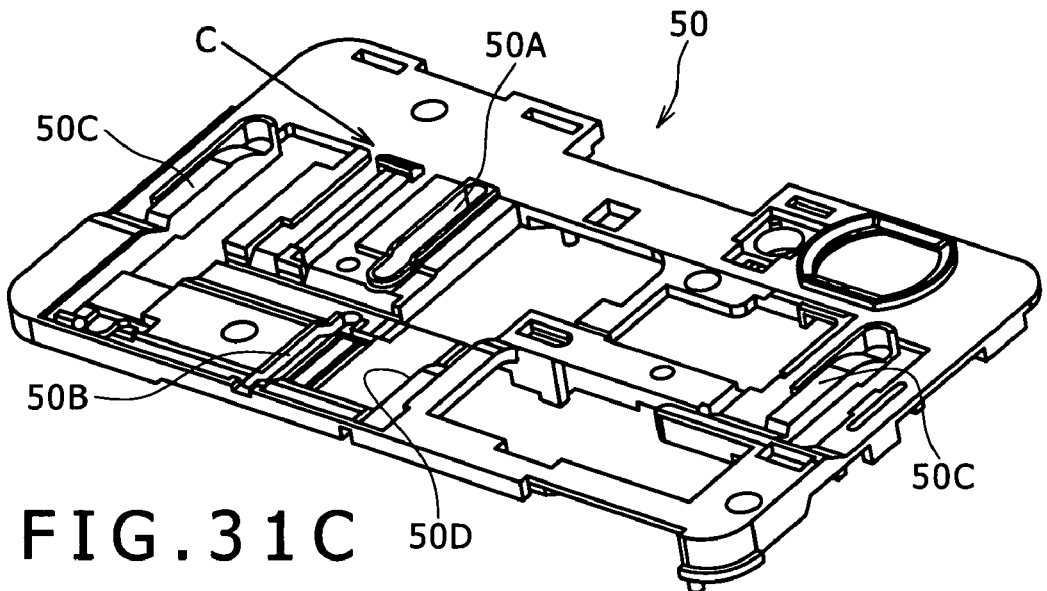
FIG. 31A is a perspective view of the inner cabinet 50.
Figure 31C:
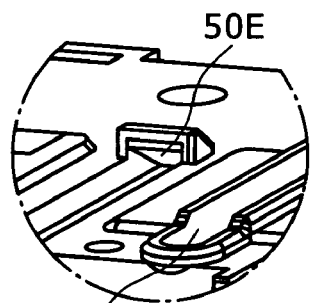
FIG. 31C is a perspective view by enlarging part C in FIG. 31A.
Figure 31B:
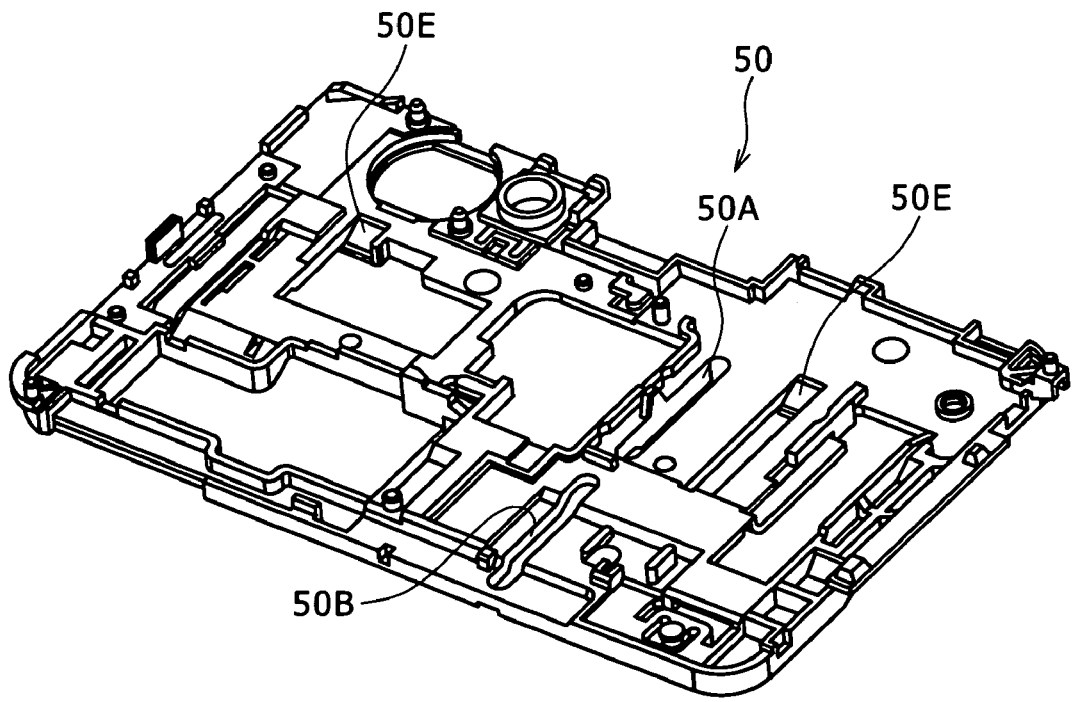
FIG. 31B is a perspective view of the inner cabinet 50 upside down.
Figure 32A:
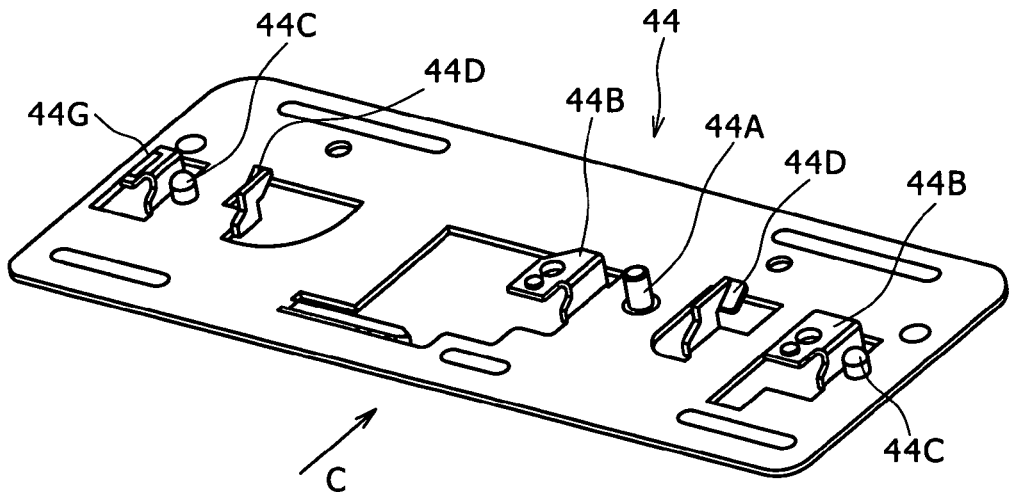
FIG. 32A is a perspective view of a frame 44.
Figure 32B:
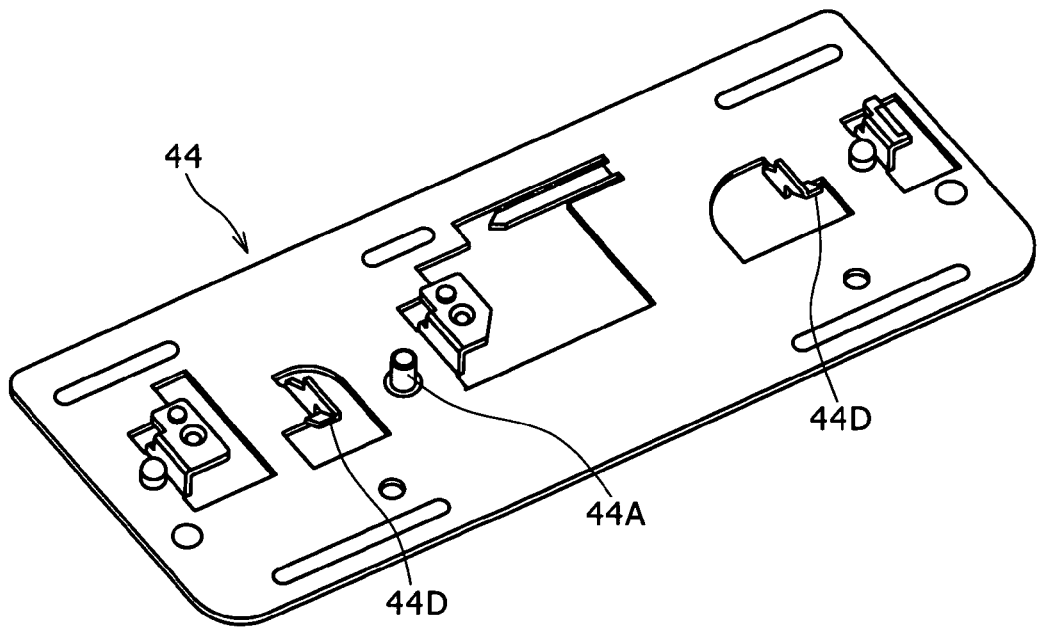
FIG. 32B is another perspective view of the frame 44.
Figure 32C:
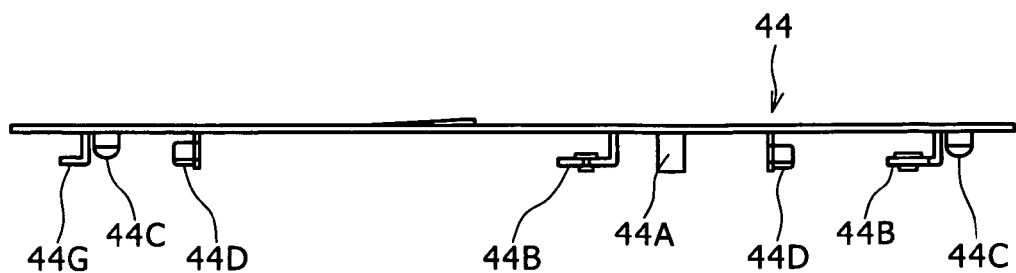
FIG. 32C is a side view of FIG. 32A viewed along an arrow C.
Figure 33A:
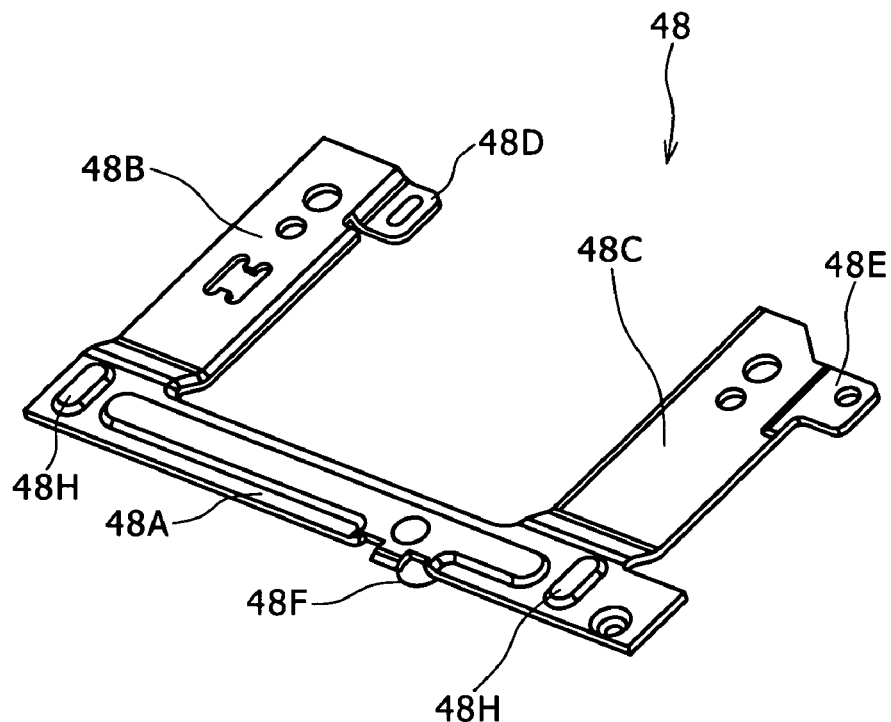
FIG. 33A is a perspective view of the slider plate 48.
Figure 33B:
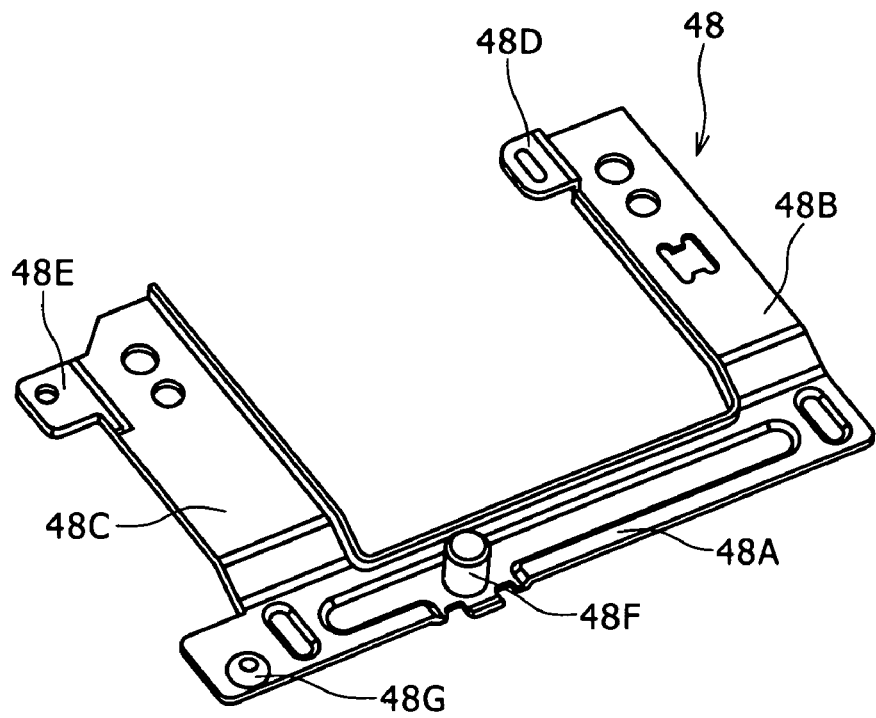
FIG. 33B is a perspective view of the slider plate 48 upside down.

FIG. 30A is a perspective view of the outer cabinet 46. FIG. 30B is a perspective view of the outer cabinet 46 upside down. FIG. 31A is a perspective view of the inner cabinet 50. FIG. 31B is a perspective view of the inner cabinet 50 upside down. FIG. 31C is a perspective view by enlarging part C in FIG. 31A. FIG. 32A is a perspective view of the frame 44. FIG. 32B is another perspective view of the frame 44. FIG. 32C is a side view of FIG. 32A viewed along an arrow C. FIG. 33A is a perspective view of the slider plate 48. FIG. 33B is a perspective view of the slider plate 48 upside down.

As shown in FIGS. 9 through 13, the first guide face 50C extends along the direction of moving the cover 36. The first guide face 50C is provided between the close position P1 and the open position P2 so as to be able to touch the two first contact members 44C.

As shown in FIGS. 13 and 15T, the first guide face 50C includes a bottom face 5002, a flat guide face 5004, and a sloping face 5006. The bottom face 5002 contacts with the first contact member 44C at the close position P1. The flat guide face 5004 is raised from the bottom face 5002 for the thickness of the cover 36. The flat guide face 5004 extends toward the open/close face 40 in parallel with the non-open/close face 42 from a position contacting with the first contact member 44C at the open position P2. The sloping face 5006 connects the flat guide face 5004 and the bottom face 5002 at a part of the flat guide face 5004 near to the open/close face 40 and lowers toward the bottom face 5002.

As shown in FIGS. 16W and 31, the second guide face 50D extends along the direction of moving the cover 36. The second guide face 50D is provided so as to be able to contact with the second contact member 48G between the close position P1 and the open position P2.

As shown in FIGS. 16W and 31, the second guide face 50D includes a bottom face 5012, a flat guide face 5014, and a sloping face 5016. The bottom face 5012 contacts with the first contact member 44C at the close position P1. The flat guide face 5014 is raised from the bottom face 5012 for the thickness of the cover 36. The flat guide face 5014 extends toward the open/close face 40 in parallel with the non-open/close face 42 from a position contacting with the second contact member 48G at the open position P2. The sloping face 5016 connects the flat guide face 5014 and the bottom face 5012 at a part of the flat guide face 5014 near to the open/close face 40 and lowers toward the bottom face 5012.

As shown in FIGS. 15V and 31, the third guide face 50E is provided so as to be able to contact with the third contact member 44D at the close position P1 of the cover 36 and a position preceding the close position P1.

The guide face 50E slopes toward the open/close face 40 or toward the rear of the front face 14.

The inner cabinet 50 has multiple openings for inserting the two mounting pieces 44B, the two first contact members 44C, the one second contact member 48G, the two third contact members 44D, the first latch 44G, and the second latch 48D to be described later.

As shown in FIG. 6, a side rail 52 is provided to the right of the inner cabinet 50 on the rear so as to face the opening.

The plate-like side rail 52 straight extends along the direction of moving the cover 36.

A latch edge 50F is formed to the left of the inner cabinet 50 on the rear. The latch edge 50F faces the openings of the inner cabinet 50 and straight extends along the direction of moving the cover 36.

As shown in FIGS. 4 and 5, the frame 44 and the slider plate 48 are provided at the rear of the cover 36.

The frame 44 is made of a rectangular metal plate approximately as large as the cover 36. The front face of the frame 44 is attached to the rear of the cover 36 with a two-sided adhesive sheet 4402.

As shown in FIG. 32, the rear of the frame 44 is provided with the first guide pin 44A, the two mounting pieces 44B, the two first contact members 44C, the two third contact members 44D, and the first latch 44G.

As shown in FIGS. 9 through 13, the first guide pin 44A protrudes from the rear of the frame 44 toward the rear at a middle of the width direction. The first guide groove 50A of the inner cabinet 50 enables the cover 36 to move in the moving direction and disables the cover 36 from moving left and right in the width direction of the cover 36.

As shown in FIG. 32, the two mounting pieces 44B are formed by bending at two locations on the rear of the frame 44 to the left with an interval in the left-right direction. The mounting piece 44B has an internal thread for mounting the slider plate 48.

The two first contact members 44C protrudes from the rear of the frame 44 at two locations near both ends along the left-right direction. The tip of the contact member 44C is curved to form a convex spherical surface.

The first contact members 44C move between the close position P1 and the open position P2 in contact with the two first guide faces 50C.

As shown in FIG. 15V, the third contact member 44D is provided so as to be able to contact with the third guide face 50E from a direction opposite the direction in which the first contact member 44C contacts with the first guide face 50C.

As shown in FIGS. 6, 15V, and 32, the third contact member 44D according to the embodiment is formed by bending at two locations near both ends of the rear of the frame 44 in the left-right direction. The third contact member 44D is formed as a slope that is positioned toward the rear as it approaches the open/close face 40.

The third contact member 44D contacts with the third guide face 50E while the first contact member 44C moves between the bottom face 5002 and part of the flat guide face 5004 near to the sloping face 5006. The third contact member 44D tilts the cover 36 from the front to the rear when the cover 36 returns to the close position P1 from the open position P2.

The first latch 44G (fifth contact member) is formed by bending toward the right at a position to the right of the rear of the frame 44. As shown in FIG. 6, the first latch 44G engages with the side rail 52 (fifty guide face) to limit the range of moving the frame 44 and the cover 36 to the front.

As shown in FIG. 5, cushioning sheets 58A and 58B are attached to the top and the bottom of the frame 44 at the rear with an adhesive. The cushioning sheets 58A and 58B are shaped like a belt and extend in the left-right direction. The cushioning sheets 58A and 58B ensure protection against a flaw due to friction between the rear face of the frame 44 and the front face of the outer cabinet 46 (the front face 14 of the housing 12) and prevent the cover 36 from being loosened in the front-rear direction.

A reference symbol 58C in FIG. 4 denotes a sliding sheet made of synthetic resin with a small friction resistance. The sliding sheet 58C is attached to the top rear of the frame 44 at the center of the left-right direction. Referring to FIG. 23, let us suppose that the frame 44 and the cover 36 move to the open position P2 from the close position P1 and allow the top end of the cover 36 to tilt toward the rear while pivoting on the first contact member 44C. In this case, the bottom end of the sliding sheet 58C contacts with the top end of the intermediate face 41 provided for the front face of the outer cabinet 46 and thus slides smoothly.

The slider plate 48 is made of a spring steel plate. As shown in FIG. 33, the slider plate 48 includes a horizontal piece 48A, a first vertical piece 48B, and a second vertical piece 48C. The horizontal piece 48A extends straight when viewed in plan. The first and second vertical pieces 48B and 48C extend from both sides of the horizontal piece 48A in a direction perpendicular to the direction of extending the horizontal piece 48A.

Tips of the first and second vertical pieces 48B and 48C are provided with through-holes for inserting screws As shown in FIG. 6, the two mounting pieces 44B of the frame 44 are positioned at the rear through the openings of the outer cabinet 46. Screws are inserted into the through-holes of the first and second vertical pieces 48B and 48C and are engaged with screw holes of the mounting pieces 44B to mount the slider plate 48 on the frame 44.

The second latch 48D (fifth contact member) protrudes from the tip of the first vertical piece 48B. As shown in FIG. 6, the second latch 48D engages with the latch edge 50F (fifth guide face) of the inner cabinet 50 to limit forward movements of the slider plate 48, the frame 44, and the cover 36.

The spring latch 48E protrudes from the tip of the second vertical piece 48C so as to engage with the other end of the toggle spring 56.

As shown in FIG. 33B, the second guide pin 48F protrudes toward the rear from a middle of the horizontal piece 48A along the extending direction. The second guide groove 50B guides the second guide pin 48F so that the second guide pin 48F moves in the moving direction of the cover 36 and does not move in the left-right direction.

As shown in FIG. 33B, the second contact member 48G is provided to one end of the horizontal piece 48A along the extending direction.

The second contact member 48G protrudes toward the rear and has a tip that is curved to form a convex spherical surface.

As shown in FIG. 16W, the second contact member 48G moves between the close position P1 and the open position P2 in contact with the second guide face 50D.

As shown in FIGS. 9 and 33A, a fourth contact member 48H protrudes from both ends of the horizontal piece 48A along the extending direction toward the front. The fourth contact member 48H is tipped with a convex spherical surface.

As shown in FIG. 16X, the fourth contact member 48H is provided so as to face a fourth guide face 46D provided on the rear face of the non-open/close face 42.

Referring to FIG. 23L, let us suppose that the cover 36 pivots on the two first contact members 44C so as to keep the bottom of the cover 36 away from the non-open/close face 42 toward the front. The fourth contact member 48H contacts with the fourth guide face 46D of the non-open/close face 42, thus preventing part of the cover 36 near to the non-open/close face 42 from tilting toward the front. According to the embodiment, the fourth contact member 48H is integrated with the slider plate 48 and is elastically deformable. Theoretically, the part of the cover 36 near to the non-open/close face 42 tilts toward the front while the fourth contact member 48H is elastically deformed.

One end of the toggle spring 56 engages with the latch pin 46C and the other end thereof engages with the spring latch 48E. In this manner, the toggle spring 56 is located between the outer cabinet 46 and the cover 36 and applies a force to the cover 36 so as to toggle between the close position P1 and the open position P2.

According to the embodiment, as shown in FIGS. 5 and 6, part of the toggle spring 56 facing toward the rear is covered with a plate-like spring cover 57 that is attached to the inner cabinet 50.

According to the embodiment, the oscillation regulating mechanism regulates oscillation of the cover 36 around a position where the first contact member 44C contacts with the first guide face 50C. The oscillation regulating mechanism includes the second contact member 48G, the second guide face 50D, the fourth contact member 48H, the fourth guide face 46D, the second latch 48D (fifth contact member), and the latch edge 50F (fifth guide face).

The following describes opening and closing operations.

A user may open or close the cover 36 without pressing it by applying a force only to the direction of moving the cover 36 or may open or close the cover 36 while pressing it. The two cases will be described separately.

<Opening and Closing the Cover 36 by Applying a Force Only to the Direction of Moving the Cover 36>
(Close Position P1)

As shown in FIGS. 14 through 17, the first contact member 44C contacts with the bottom face 5002 of the first guide face 50C.

The second contact member 48G contacts with the bottom face 5012 of the second guide face 50D.

The third contact member 44D contacts with the third guide face 50E.

The toggle spring 56 presses the cover 36 to the close position P1. The third contact member 44D contacts with the third guide face 50E. In this manner, the cover 36 is stably seated at the close position P1 without loosening. At the close position P1, the cushioning sheet 58A and the sliding sheet 58C provided for the frame 44 contact with the open/close face 40. The cushioning sheet 58B contacts with the intermediate face 41.

At the close position P1, the cover 36 almost levels with the front face 14 of the housing 12. This makes it possible to eliminate irregularity from the front face 14 of the housing 12 and improve portability and design.

(Moving from the Close Position P1 to the Open Position P2)

Referring to FIGS. 18 through 21, let us suppose that the user moves the cover 36 from the close position P1 to the open position P2. The first contact member 44C is raised in contact with the first guide face 50C from the bottom face 5002 to the sloping face 5006. The second contact member 48G is raised in contact with the second guide face 50D from the bottom face 5012 to the sloping face 5016. The cover 36 moves to the open position P2 while tilting toward the front of the intermediate face 41. As shown in FIG. 21B, the first and second latches 44G and 48D engage with the side rail 52 and the latch edge 50F from a direction opposite the direction in which the first contact member 44C contacts with the first guide face 50C. This makes it possible to prevent the cover 36 from being loosened in the front-rear direction.

The first contact member 44C moves to the open position P2 in contact with the flat guide face 5004 of the first guide face 50C. The second contact member 44G moves to the open position P2 in contact with the flat guide face 5014 of the second guide face 50D. The cover 36 moves to the open position P2 by keeping in parallel with the non-open/close face 42. The first and second latches 44G and 48D engage with the side rail 52 and the latch edge 50F from a direction opposite the direction in which the first contact member 44C contacts with the first guide face 50C. This makes it possible to prevent the cover 36 from being loosened in the front-rear direction.

The direction of applying a force from the toggle spring 56 changes in the middle of the close position P1 and the open position P2. The cover 36 is pressed against the open position P2.

The cover 36 reaches the open position P2 while the first and second guide pins 44A and 48F contact with the ends of the first and second guide grooves 50A and 50B.

At the open position P2, as shown in FIGS. 24 through 27, the first contact member 44C contacts with the flat guide face 5004 of the first guide face 50C. The second contact member 48G contacts with the flat guide face 5014 of the second guide face 50D. As shown in FIG. 27B, the first and second latches 44G and 48D engage with the side rail 52 and the latch edge 50F from a direction opposite the direction in which the first contact member 44C contacts with the first guide face 50C. This makes it possible to prevent the cover 36 from being loosened in the front-rear direction.

(Moving from the Open Position P2 to the Close Position P1)

Let us suppose that the user moves the cover 36 from the open position P2 to the close position P1. As shown in FIGS. 24 through 27, the first contact member 44C moves to the close position P1 in contact with the flat guide face 5004 of the first guide face 50C. The second contact member 48G moves to the close position P1 in contact with the flat guide face 5014 of the second guide face 50D. As shown in FIG. 27B, the first and second latches 44G and 48D engage with the side rail 52 and the latch edge 50F from a direction opposite the direction in which the first contact member 44C contacts with the first guide face 50C. This makes it possible to prevent the cover 36 from being loosened in the front-rear direction.

The direction of applying a force from the toggle spring 56 changes in the middle of the open position P2 and the close position P1. The cover 36 is pressed against the close position P1.

As shown in FIGS. 28 and 29, the first contact member 44C reaches the end near the sloping face 5006 of the flat guide face 5004. The second contact member 48G reaches the end near the sloping face 5016 of the flat guide face 5014. The first and second contact members 44C and 48G do not contact with the flat guide faces 5004 and 5014. The third contact member 44D contacts with the third guide face 50E. The third contact member 44D moves to the close position P1 in contact with the third guide face 50E. Concurrently, the cover 36 moves to the close position P1 while tilting toward the rear. No friction resistance occurs between the first and second contact members 44C and 48G and the flat guide faces 5004 and 5014. This decreases a force for moving the cover 36 and therefore improves operational feeling of the cover 36.

As shown in FIGS. 14 through 17, the cover 36 reaches the close position P1 while the first and second guide pins 44A and 48F contact with the ends of the first and second guide grooves 50A and 50B.

The toggle spring 56 presses the cover 36 to the close position P1 without loosening. The third contact member 44D contacts with the third guide face 50E. In this manner, the cover 36 is stably seated at the close position P1. At the close position P1, the cushioning sheet 58A and the sliding sheet 58C provided for the frame 44 contact with the open/close face 40. The cushioning sheet 58B contacts with the intermediate face 41.

<Opening and Closing the Cover 36 by Pressing It>
(Close Position P1)

As shown in FIGS. 14 through 17, the first contact member 44C contacts with the bottom face 5002 of the first guide face 50C.

The second contact member 48G contacts with the bottom face 5012 of the second guide face 50D.

The third contact member 44D contacts with the third guide face 50E.

The toggle spring 56 presses the cover 36 to the close position P1. The third contact member 44D contacts with the third guide face 50E. In this manner, the cover 36 is stably seated at the close position P1 without loosening. At the close position P1, the cushioning sheet 58A and the sliding sheet 58C provided for the frame 44 contact with the open/close face 40. The cushioning sheet 58B contacts with the intermediate face 41.

(Moving from the Close Position P1 to the Open Position P2)

Referring to FIGS. 22 and 23, let us suppose that the user moves the cover 36 from the close position P1 to the open position P2 by pressing the top of the cover 36 toward the rear. The first contact member 44C is raised in contact with the first guide face 50C from the bottom face 5002 to the sloping face 5006. At this time, the cover 36 oscillates around a supporting point where the first contact member 44C contacts with the sloping face 5006. That is, the cover 36 oscillates toward the front, namely, in the direction along which the bottom of the cover 36 moves away from the non-open/close face 42. As a result, the cover 36 tilts against the open/close face 40 and the non-open/close face 42.

As shown in FIG. 23K, the second contact member 48G is raised away from the sloping face 5016 of the second guide face 50D. The cover 36 moves to the open position P2 while tilting toward the front of the intermediate face 41.

As shown in FIG. 23L, the fourth contact member 48H contacts with the fourth guide face 46D of the non-open/close face 42 to limit an oscillation range of the cover 36.

When moving to the open position P2, the cover 36 is prevented from wobbling downward. The operational feeling is improved.

The first contact member 44C moves to the open position P2 in contact with the flat guide face 5004 of the first guide face 50C. The second contact member 48G moves to the open position P2 while getting away from the flat guide face 5014 of the second guide face 50D. The cover 36 moves to the open position P2 while tilting toward the open/close face 40 and the non-open/close face 42. As shown in FIG. 23L, the fourth contact member 48H contacts with the fourth guide face 46D of the non-open/close face 42 to limit an oscillation range of the cover 36.

The direction of applying a force from the toggle spring 56 changes in the middle of the close position P1 and the open position P2. The cover 36 is pressed against the open position P2.

The cover 36 reaches the open position P2 while the first and second guide pins 44A and 48F contact with the ends of the first and second guide grooves 50A and 50B.

At the open position P2, as shown in FIGS. 24 through 27, the first contact member 44C contacts with the flat guide face 5004 of the first guide face 50C. The second contact member 48G contacts with the flat guide face 5014 of the second guide face 50D. As shown in FIG. 27B, the first and second latches 44G and 48D engage with the side rail 52 and the latch edge 50F from a direction opposite the direction in which the first contact member 44C contacts with the first guide face 50C. This makes it possible to prevent the cover 36 from being loosened in the front-rear direction.

At the open position P2, as shown in FIG. 25E, the fourth contact member 48H is slightly away from the fourth guide face 46D of the non-open/close face 42.

(Moving from the Open Position P2 to the Close Position P1)

Let us suppose that the user moves the cover 36 from the open position P2 to the close position P1 while pressing the top of the cover 36. As shown in FIGS. 24 through 27, the first contact member 44C moves to the close position P1 in contact with the flat guide face 5004 of the first guide face 50C. The second contact member 48G moves to the close position P1 in contact with the flat guide face 5014 of the second guide face 50D. As shown in FIG. 27B, the first and second latches 44G and 48D engage with the side rail 52 and the latch edge 50F from a direction opposite the direction in which the first contact member 44C contacts with the first guide face 50C. This makes it possible to prevent the cover 36 from being loosened in the front-rear direction.

The direction of applying a force from the toggle spring 56 changes in the middle of the open position P2 and the close position P1. The cover 36 is pressed against the close position P1.

As shown in FIGS. 22 and 23, the first contact member 44C is lowered in contact with the first guide face 50C from the flat guide face 5004 to the sloping face 5006. At this time, the cover 36 oscillates around a supporting point where the first contact member 44C contacts with the sloping face 5006. That is, the cover 36 oscillates toward the front, namely, in the direction along which the bottom of the cover 36 moves away from the non-open/close face 42. As a result, the cover 36 tilts against the open/close face 40 and the non-open/close face 42.

As shown in FIG. 23K, the second contact member 48G is lowered away from the sloping face 5016 of the second guide face 50D. The cover 36 moves to the close position P1 while tilting toward the rear. At this time, the third contact member 44D stays away from the third guide face 50E. No friction resistance occurs between the second contact member 48G and the second guide face 50D. This decreases a force for moving the cover 36 and therefore improves operational feeling of the cover 36.

As shown in FIG. 23L, the fourth contact member 48H contacts with the fourth guide face 46D of the non-open/close face 42 to limit an oscillation range of the cover 36.

When moving to the open position P2, the cover 36 is prevented from wobbling downward. The operational feeling is improved.

The first contact member 44C moves from the sloping face 5006 to the bottom face 5002 in contact with the same. The second contact member 48G moves to the bottom face 5012 while getting away from the sloping face 5016 and finally contacts with the bottom face 5012.

As shown in FIGS. 14 through 17, the cover 36 reaches the close position P1 while the first and second guide pins 44A and 48F contact with the first and second guide grooves 50A and 50B.

The toggle spring 56 presses the cover 36 to the close position P1. The third contact member 44D contacts with the third guide face 50E. In this manner, the cover 36 is stably seated at the close position P1 without loosening. At the close position P1, the cushioning sheet 58A and the sliding sheet 58C provided for the frame 44 contact with the open/close face 40. The cushioning sheet 58B contacts with the intermediate face 41.

According to the embodiment, the cover 36 almost levels with the front face 14 of the housing 12 at the close position P1, improving the portability and the design. The support mechanism 38 supports the cover 36 so as to be movable between the close position P1 and the open position P2. The support mechanism 38 includes the two first contact members 44C, the first guide face 50C, and the oscillation regulating mechanism that regulates oscillation of the cover 36 around a supporting point where the first contact member 44C contacts with the first guide face 50C. An unnecessary force is not applied to the support mechanism 38 independently of whether the cover 36 is opened and closed by applying a force to the cover 36 in the direction of moving the cover 36 or by pressing the cover 36 and applying a force to the cover 36 in a direction orthogonal to the direction of moving the cover 36. This is advantageous for improving operability and durability of the support mechanism 38.

The film 54 will be described.

As mentioned above, the cabinet is included in the front face of the housing 12. As shown in FIGS. 4 and 5, the cabinet includes the outer cabinet 46 and the inner cabinet 50 provided inside the outer cabinet 46.

As shown in FIGS. 7 and 8, a printed circuit board 27A is provided at a position opposite the front face 14 inside the housing 12 and toward the rear face of the inner cabinet 50. Electronic parts 27B such as an IC, a LSI, chips and connectors are mounted on the side of the printed circuit board 27A facing the rear of the cabinet.

The film 54 is made of an insulative material and is provided between the inner cabinet 50 and the printed circuit board 27A.

The film 54 is made of a black synthetic resin material such as insulative, light blocking, waterproof polycarbonate. The film 54 is as thick as approximately 0.1 through 0.15 mm.

According to the embodiment, as shown in FIG. 8, the lens barrel 26 is provided adjacently to the printed circuit board 27A inside the housing 12 toward the rear face of the inner cabinet 50. The film 54 is molded together with a substrate 54A, multiple electronic part containers 54B protruding from the substrate 54A, and a lens barrel insulator 54C covering the lens barrel 26.

The substrate 54A is provided adjacently to the printed circuit board 27A so as to cover the printed circuit board 27A.

The electronic part containers 54B each have a side wall and a top wall. The side wall is raised almost perpendicularly to the substrate 54A and surrounds the electronic parts 27B. The top wall parallels the substrate 54A and connects with the tip of the side wall in the direction of rising. The electronic part containers 54B are provided so as to be opened toward the printed circuit board 27A and protrude to the rear face of the inner cabinet 50. The electronic part container 54B contains each of the electronic parts 27B.

The lens barrel insulator 54C is provided so as to cover a position where the lens barrel 26 faces the rear face of the inner cabinet 50.

The film 54 may be fastened in a variety of ways. For example, the film 54 may be attached to the printed circuit board 27A using an adhesive. Alternatively, the film 54 may be sandwiched between part of the printed circuit board 27A and part of the inner cabinet 50.

According to the configuration, the film 54 is provided between the inner cabinet 50 and the printed circuit board 27A. the film 54 is molded including the substrate 54A and the electronic part containers 54B. The film 54 provides insulation for the printed circuit board 27A and the electronic parts 27B and ensures a large space between the inner cabinet 50 and the printed circuit board 27A. This is advantageous for arranging members and parts. The space can be used effectively.

The electronic parts 27B may be mounted on the printed circuit board 27A so as to ensure a space that can place and move the two third contact members 44D, the second patch 48D (fifth contact member), and the latch edge 50F (fifth guide face) belonging to the support mechanism. In this case, the substrate 54A of the film 54 approaches and covers the printed circuit board. The electronic part containers 54B on the substrate 54A contain the electronic parts. It is possible to maximally ensure the space formed between the electronic parts 27B on the film 54 facing the inner cabinet 50 both in the thickness direction of the printed circuit board 27A and in a direction orthogonal to the thickness direction.

The space ensured on the film 54 facing the inner cabinet 50 can be effectively and economically used for moving the two third contact members 44D, the second patch 48D (fifth contact member), and the latch edge 50F (fifth guide face). This is advantageous for miniaturizing and thinning the imaging device 10.

A lubricant agent such as grease may be applied to reduce friction at contacts between the two contact members 44C and the first guide face 50C, between the second contact member 48G and the second guide face 50D, and between the two third contact members 44D and the third guide face 50E belonging to the support mechanism 38. It might be considered that opening and closing the cover 36 scatters the lubricant agent. Actually, no lubricant agent is applied to the printed circuit board 27A or the electronic parts 27B because the film 54 is provided between the inner cabinet 50 and the printed circuit board 27A. This is advantageous for preventing the printed circuit board 27A or the electronic parts 27B from being deteriorated or contaminated due to the lubricant agent.

The lens barrel insulator 54C of the film 54 covers part of the lens barrel 26 facing the rear of the inner cabinet 50, preventing light from entering the inside of the lens barrel 26 from the inner cabinet 50. This is advantageous for improving the quality of an image captured by the imaging element 34A.

The substrate 54A of the film 54 and the electronic part containers 54B cover the printed circuit board 27A and the electronic parts 27B. In addition, the lens barrel insulator 54C covers the lens barrel 26, making it possible to hide the inside of the housing 12 from gaps or openings of the housing 12. This is favorable to improving cosmetic quality of the imaging device 10. It is also possible to prevent water or dust from entering the housing 12 from gaps or openings of the housing 12. This is advantageous for ensuring durability of the printed circuit board 27A, the electronic parts 27B, and the lens barrel 26.

The telescopic switch 30D and the wide-angle switch 30E will be described.

Figure 34:
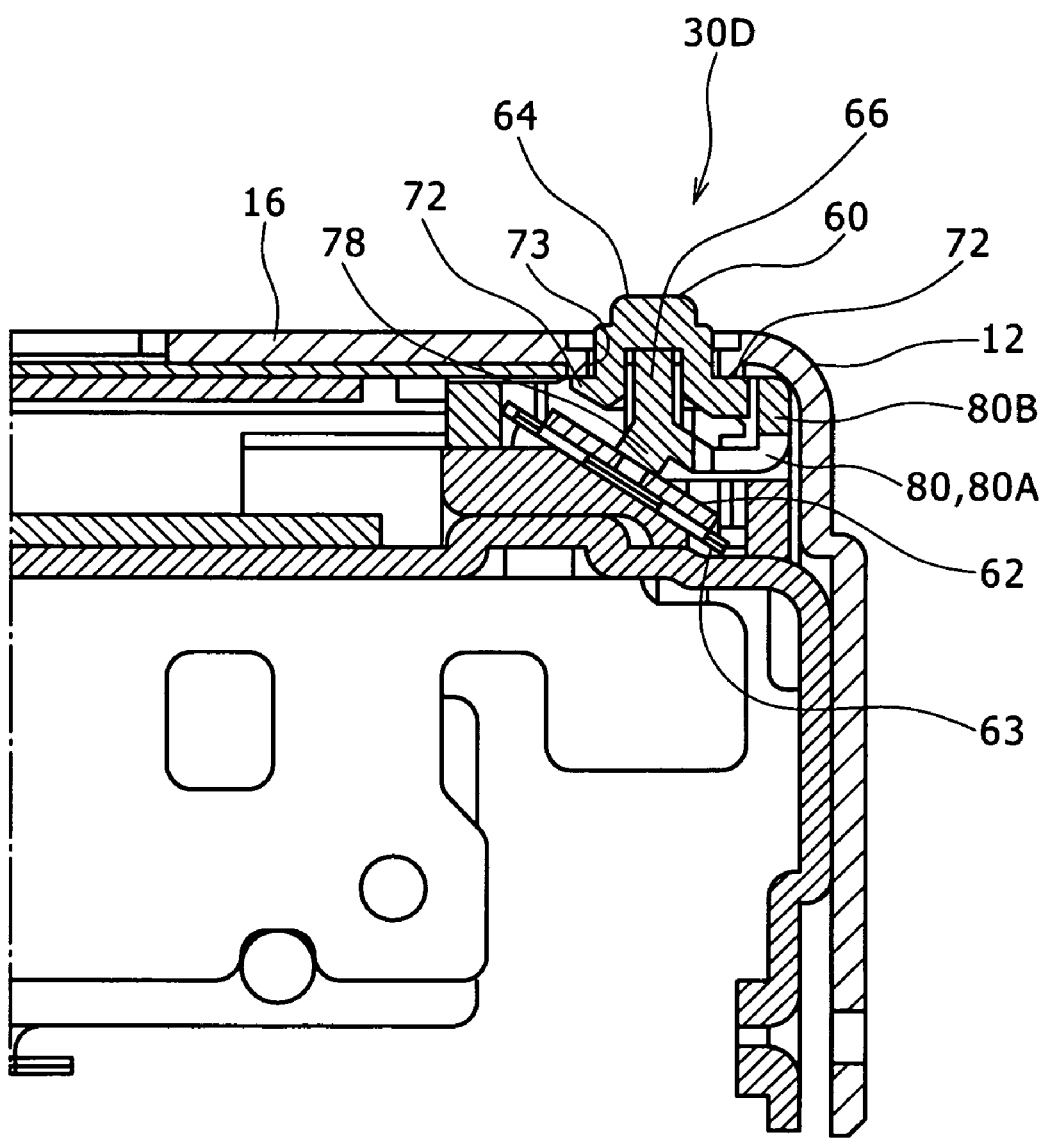
FIG. 34 is a cross sectional view taken along the line AA of FIG. 2.
Figure 35:
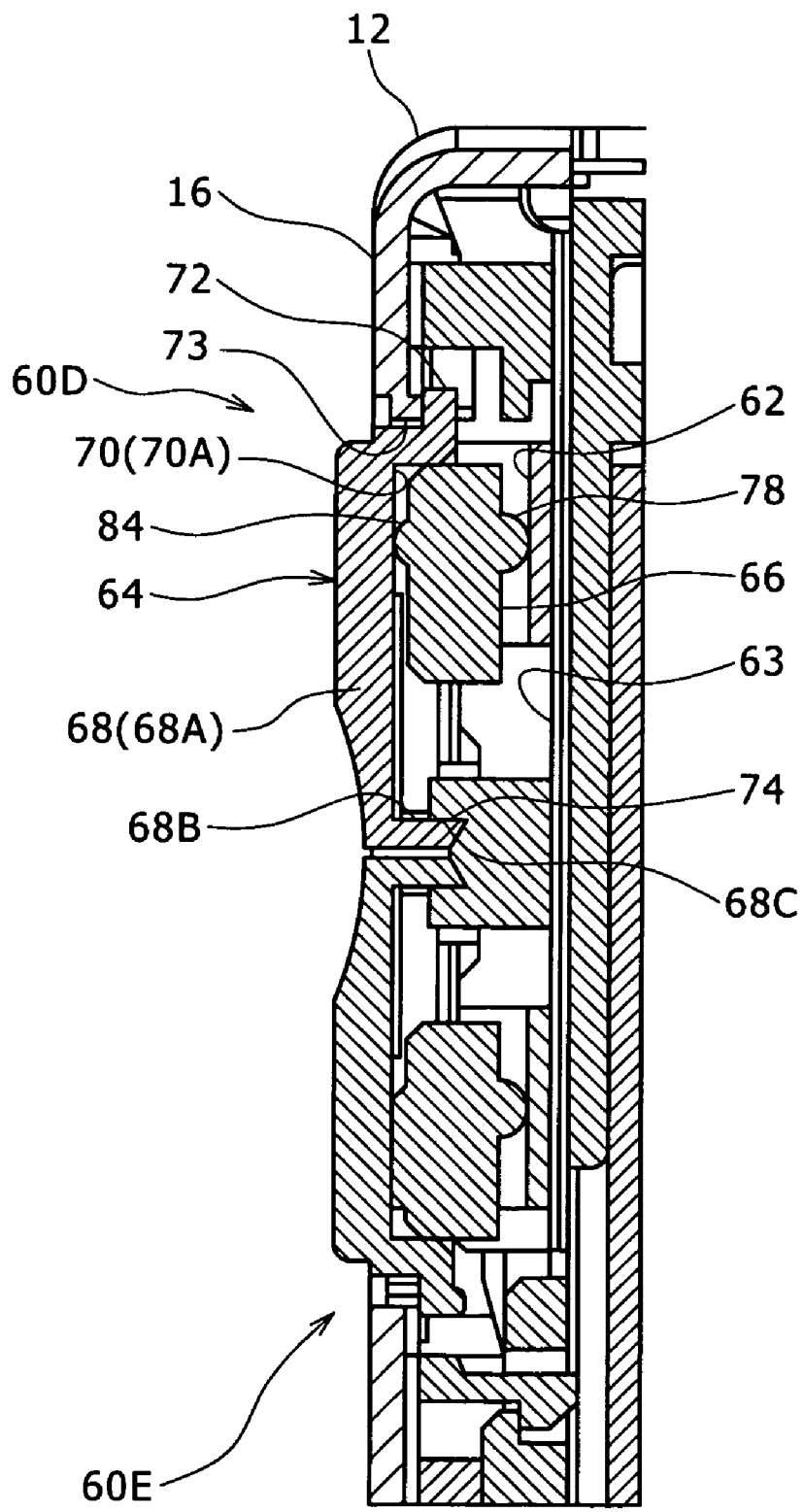
FIG. 35 is a cross sectional view taken along the line BB of FIG. 2.
Figure 36:
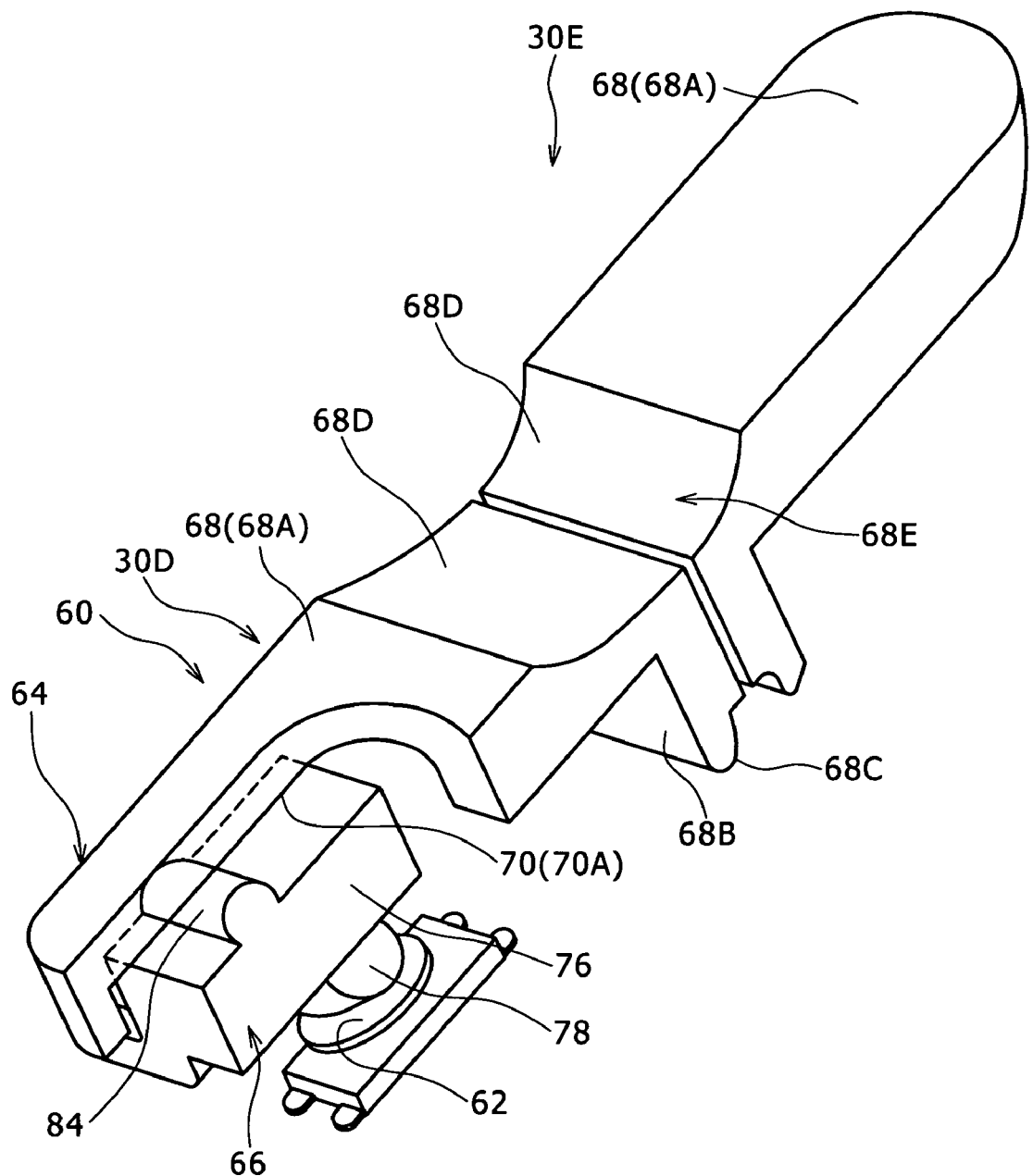
FIG. 36 is a perspective view showing a main part of a telescopic switch 30D by partially exploding an exterior member 64.
Figure 37:
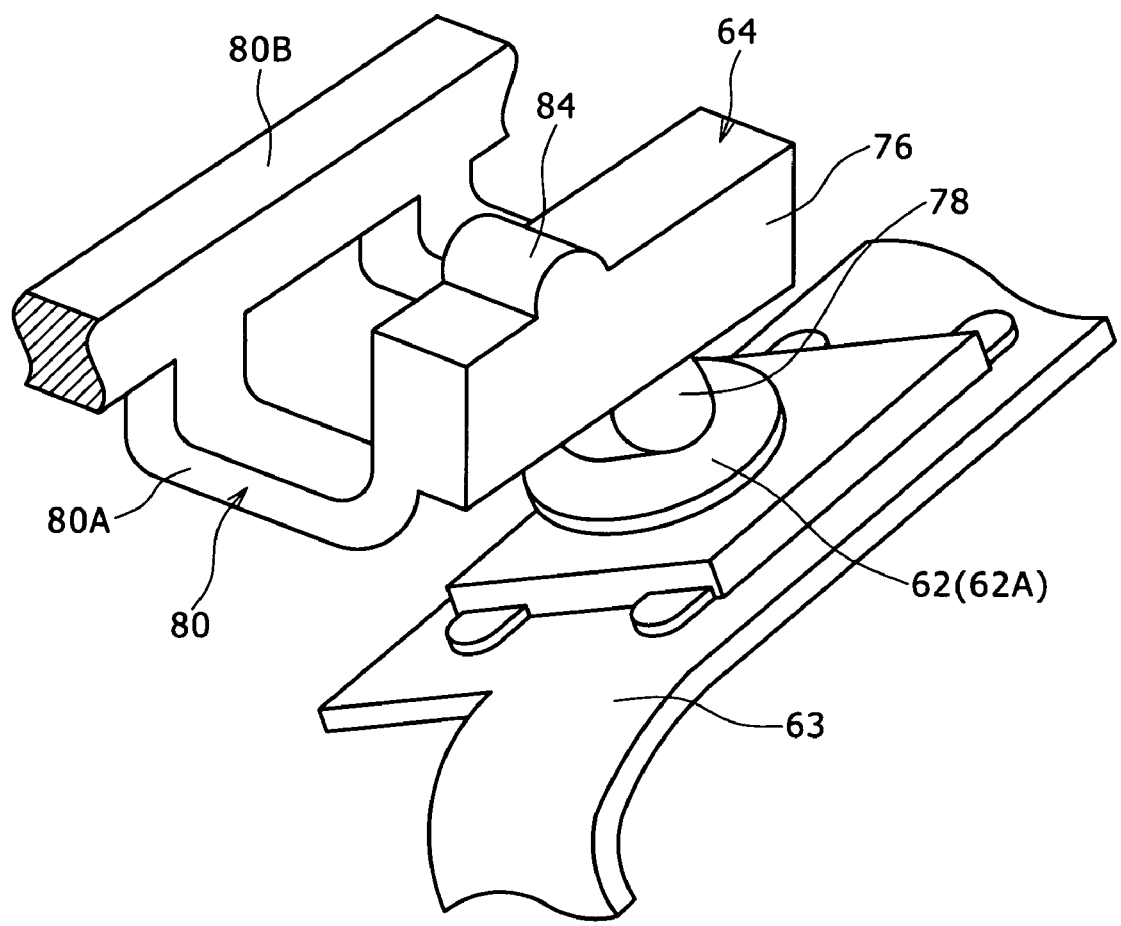
FIG. 37 is a perspective view showing positional relation between an interior member 66 and an electric contact 62.

FIG. 34 is a cross sectional view taken along the line AA of FIG. 2. FIG. 35 is a cross sectional view taken along the line BB of FIG. 2. FIG. 36 is a perspective view showing a main part of the telescopic switch 30D by partially exploding an exterior member 64. FIG. 37 is a perspective view showing positional relation between an interior member 66 and an electric contact 62. In FIG. 36, the shape of the exterior member 64 is partially omitted for simplicity of the drawing.

As shown in FIG. 2, a vertically long slit 73 is provided at the top left on the rear face 16 of the housing 12. The telescopic switch 30D and the wide-angle switch 30E are vertically placed in the slit 73.

As shown in FIGS. 34 and 35, the telescopic switch 30D and the wide-angle switch 30E include an operation member 60 provided on the rear face 16 of the housing 12. Pressing the operation member 60 turns on or off the electric contact 62 provided in the housing 12. According to the embodiment, the telescopic switch 30D and the wide-angle switch 30E provide an operation apparatus. The upper part of the operation member 60 functions as the telescopic operation member 60. The lower part of the operation member 60 functions as the wide-angle operation member 60.

The electric contact 62 includes a pressed face 62A pressed by the operation member 60. The pressed face 62A is arranged so as to tilt in the direction of pressing the operation member 60.

In more detail, the electric contact 62 is mounted on a printed circuit board 63 attached inside the housing 12. The pressed face 62A parallels the printed circuit board 63. The printed circuit board 63 also tilts in the direction of pressing the operation member 60.

As shown in FIG. 34, the printed circuit board 63, the exterior member 64, and the interior member 66, to be described later, are provided in a dead space at a left corner of the housing 12.

As shown in FIGS. 34 through 36, the operation member 60 includes the exterior member 64 and the interior member 66.

The exterior member 64 of each operation member 60 is formed to be long and thin. The exterior members 64 are arranged so as to be aligned on the same line in a longitudinal direction. The exterior members 64 are provided so as to pivot on each of one ends thereof opposite to each other along the longitudinal direction.

According to the embodiment, the operation members 60 are arranged at the top left of the rear face 16 so as to be aligned with the same line corresponding to the vertically longitudinal direction of the operation members 60.

The exterior member 64 includes an operation section 68, an engaging section 70, and a stopper 72.

The exterior member 64 is made of synthetic resin and is integrally molded.

As shown in FIGS. 35 and 36, the operation section 68 includes a thin and long flat section 68A and a bent section 68B that is bent from the end of the flat section 68A. A protrusion 68C is provided at the tip of the bent section 68B and engages with a recess 74 on the side of the housing 12 (FIG. 35). The exterior member 64 oscillates around a supporting point where the protrusion 68C engages with the recess 74. In more detail, the exterior member 64 of each operation member 60 is provided so that each of one ends opposite to each other can oscillate around a shaft center as a supporting point extending in the left-right direction of the housing 12.

The flat section 68A is exposed from the rear face 16 (surface) of the housing 12 and is pressed to perform a corresponding operation.

The engaging section 70 engages with the interior member 66 and is provided at a position where the flat section 68A is located inside the housing 12.

The engaging section 70 is formed as an engaging recess 70A.

The engaging recess 70A is formed to be thin and long along the longitudinal direction of the exterior member 64.

As shown in FIGS. 34 and 35, the stopper 72 is provided for the operation section 68. The stopper 72 latches onto the inside of the housing 12 around the slit 73 to limit a maximum protruding position of the operation section 68 on the rear face 16 (surface) of the housing 12.

As shown in FIGS. 36 and 37, the interior member 66 includes a body 76, a pressing protrusion 78, and a hinge 80.

The interior member 66 is made of synthetic resin and is integrally molded.

The body 76 engages with the exterior member 64 and moves in a direction of pressing the exterior member 64.

As shown in FIGS. 35 and 36, the body 76 includes a flat section 82 and a curved section 84. The flat section 82 can be inserted into the engaging recess 70A and is formed to be thin and long along the longitudinal direction of the engaging recess 70A. The curved section 84 protrudes from a surface of the flat section 82 facing the bottom of the engaging recess 70A and engages with the bottom thereof. When the exterior member 64 is pressed, the curved section 84 engages with the bottom of the engaging recess 70A, allowing the interior member 66 to move smoothly.

The pressing protrusion 78 has a curved surface to be pressed against the pressed face 62A for smoothing a press against the pressed face 62A.

The pressing protrusion 78 protrudes from the body 76 so as to be perpendicular to the pressed face 62A. As shown in FIG. 34, the pressing protrusion 78 protrudes slantwise from the body 76.

The hinge 80 protrudes from the body 76, latches onto a position inside the housing 12, and is capable of being elastically deformed.

The pressing protrusion 78 and the hinge 80 protrude from the body 76 in directions opposite to each other.

The hinge 80 continuously presses the exterior member 64 in a direction protruding from the surface of the housing 12. When the exterior member 64 is pressed, the hinge 80 is elastically deformed and allows the body 76 to move and allows the pressing protrusion 78 to press against the pressed face 62A.

According to the embodiment, the hinge 80 includes two legs 80A and a connecting section 80B. The legs 80A protrude from the body 76. The connecting section 80B connects tips of the legs 80A. As shown in FIG. 34, the connecting section 80B engages with the recess of the housing 12.

The interior member 66 oscillates around the connecting section 80B of the hinge 80. In other words, the interior member 66 oscillates around a shaft center as a supporting point extending in the vertical direction of the housing 12.

Operations will be described below.

For example, let us suppose that the user presses the telescopic or wide-angle operation member 60 with his or her finger against a force applied from the hinge 80. The exterior member 64 oscillates to oscillate the interior member 66 through the hinge 80. The pressing protrusion 78 presses pressed face 62A to turn on the electric contact 62. The telescopic switch 30D or the wide-angle switch 30E supplies an operation signal to the control section 34 for a zooming operation.

When the finger is released from the exterior member 64, the hinge 80 applies a force to move the exterior member 64 along with the interior member 66 in a direction protruding from the rear face 16 of the housing 12. The stopper 72 engages with the inside of the housing 12 around the slit 73 to protrude the exterior member 64 to the maximum.

This operation releases the pressed face 62A from the press due to the pressing protrusion 78 and turns off the electric contact 62. The telescopic switch 30D or the wide-angle switch 30E stops supplying the operation signal to the control section 34. The zooming operation stops.

According to such configuration, the pressed face 62A is pressed by the telescopic or wide-angle operation member 60 and tilts in the direction of pressing the operation member 60. It is possible to reduce a projected area of the electric contact 62 and the printed circuit board 63 on the rear face 16 (surface) of the housing 12. This is advantageous for miniaturization by reducing the space in the width direction of the housing 12.

According to the embodiment, the exterior member 64, the interior member 66, and the printed circuit board 63 are provided in the dead space at the left corner of the housing 12. The space in the housing 12 can be used effectively. This is more advantageous for miniaturization.

According to the embodiment, the exterior member 64 oscillates around the shaft center as a supporting point extending in the left-right direction of the housing 12. The interior member 66 oscillates around the shaft center as a supporting point extending in the vertical direction of the housing 12. The supporting points are provided at different positions. This is advantageous for placing the exterior member 64 and the interior member 66 in a narrow dead space.

According to the embodiment, the pressing protrusion 78 of the interior member 66 is protruded slantwise against the body 76. The exterior member 64 and the interior member 66 cause a larger displacement than that of the pressing protrusion 78. A large stroke can be ensured for moving the exterior member 64 in comparison with the amount of movement for pressing the electric contact 62 through the interior member 66 in order to turn on or off the electric contact 62.

Even when the electric contact 62 is pressed slightly, the user can feel a sufficient press of the exterior member 64 because a large stroke is ensured for the exterior member 64. This is advantageous for improving the operability.

According to the embodiment, as shown in FIG. 36, the two exterior members 64 are provided along the same line. The two exterior members 64 are configured to oscillate around positions as supporting points where the flat sections 68A of the exterior members 64 are adjacent to each other. A recess 68D is provided for each of the exterior members 64 where the exterior members 64 are adjacent to each other. The two recesses 68D are configured to form a single recess 68E.

Even when the user presses the recess 68E with his or her finger, the exterior member 64 is not pressed inadvertently. This is advantageous for preventing each of the exterior members 64 from being operated inadvertently.

When a finger is placed on the recess 68E, sliding the finger in the direction of extending the exterior member 64 can fast make ready for pressing one of the two exterior members 64. The user need not visually check the finger position. This is advantageous for improving the operability.

The digital still camera according to the embodiment is requested to ensure a large area of the display 32 on the rear face 16 without changing the external dimension of the housing 12. The trend is to reduce the space for the rear face 16 except the display 32. There may be a need for placing the operation apparatus in a narrow space.

By contrast, the use of the above-mentioned operation apparatus occupies a small space. The operation apparatus can be easily arranged in a dead space. The operation apparatus can be placed in the vicinity of a line formed between the rear face 16 and the left face 20 of the housing 12. This is advantageous for arranging the operation apparatus in the limited space at the rear face 16 of the housing 12.

The embodiment has described that the imaging device 10 represents an electronic device such as a digital still camera. An embodiment of the invention can be applied to various electronic devices such as a video camera, mobile telephone, PDA, music player, and notebook computer.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
   a housing; and
   a plate-like cover that is provided for one face of the housing and is movable between a close position and an open position,
   in which the one face includes an open/close face and a non-open/close face, the open/close face being hidden by the cover when the cover is in the close position and is exposed when the cover is in the open position, and the non-open/close face being exposed when the cover is in the close position and is hidden by the cover when the cover is in the open position,
   a support mechanism to movably support the cover between the close position and the open position,
   in which the non-open/close face and the open/close face are parallel to each other, and in which the non-open/close face is located frontward from the open/close face by an amount approximately equal to a thickness of the cover, and
   in which the support mechanism includes,
   two first contact members protruding toward the one face from locations on the cover with an interval in a direction orthogonal to a direction of moving the cover,
   a first guide face that is provided toward the one face, extends along a direction of moving the cover, and is capable of contacting with the two first contact members between the close position and the open position, and
   an oscillation regulating mechanism for regulating oscillation of the cover at a supporting point where the first contact member contacts with the first guide face.

2. An electronic device comprising:
   a housing; and
   a plate-like cover that is provided for one face of the housing and is movable between a close position and an open position,
   in which the one face includes an open/close face and a non-open/close face, the open/close face being hidden by the cover when the cover is in the close position and is exposed when the cover is in the open position, and the non-open/close face being exposed when the cover is in the close position and is hidden by the cover when the cover is in the open position, a support mechanism to movably support the cover between the close position and the open position, in which the non-open/close face protrudes frontward from the open/close face by an amount approximately equal to a thickness of the cover, and in which the support mechanism includes, two first contact members protruding toward the one face from locations on the cover with an interval in a direction orthogonal to a direction of moving the cover, a first guide face that is provided toward the one face, extends along a direction of moving the cover, and is capable of contacting with the two first contact members between the close position and the open position, and an oscillation regulating mechanism for regulating oscillation of the cover at a supporting point where the first contact member contacts with the first guide face, wherein: the cover levels with the non-open/close face at the close position; and the first guide face includes a bottom face, a flat guide face, and a sloping face, the bottom face contacting with the first contact member at the close position, the flat guide face protruding frontward from the face for a thickness of the cover in comparison with the bottom face and paralleling the non-open/close face toward the open/close face from a position in contact with the first contact member at the open position, and the sloping face connecting the flat guide face with the bottom face near the open/close face of the flat guide face and being located rearward of the face as the bottom face is approached.

3. The electronic device of claim 1, wherein the oscillation regulating mechanism includes a second contact member and a second guide face, the second contact member protruding toward the one face from a position on the cover at an interval with reference to the first contact member in a direction of moving the cover, and the second guide face being provided toward the one face, extending along a direction of moving the cover, and being capable of contacting with the second contact member between the close position and the open position.

4. An electronic device comprising:

a housing; and a plate-like cover that is provided for one face of the housing and is movable between a close position and an open position, in which the one face includes an open/close face and a non-open/close face, the open/close face being hidden by the cover when the cover is in the close position and is exposed when the cover is in the open position, and the non-open/close face being exposed when the cover is in the close position and is hidden, by the cover when the cover is in the open position, a support mechanism to movably support the cover between the close position and the open position, in which the non-open/close face protrudes frontward from the open/close face by an amount approximately equal to a thickness of the cover, and in which the support mechanism includes, two first contact members protruding toward the one face from locations on the cover with an interval in a direction orthogonal to a direction of moving the cover, a first guide face that is provided toward the one face, extends along a direction of moving the cover, and is capable of contacting with the two first contact members between the close position and the open position, and an oscillation regulating mechanism for regulating oscillation of the cover at a supporting point where the first contact member contacts with the first guide face, wherein the oscillation regulating mechanism includes a second contact member and a second guide face, the second contact member protruding toward the one face from a position on the cover at an interval with reference to the first contact member in a direction of moving the cover, and the second guide face being provided toward the one face, extending along a direction of moving the cover, and being capable of contacting with the second contact member between the close position and the open position, wherein: the cover levels with the non-open/close face at the close position; and the second guide face includes a bottom face, a flat guide face, and a sloping face, the bottom face contacting with the second contact member at the close position, the flat guide face protruding frontward from the face for a thickness of the cover in comparison with the bottom face and paralleling the non-open/close face toward the open/close face from a position in contact with the second contact member at the open position, and the sloping face connecting the flat guide face with the bottom face near the open/close face of the flat guide face and being located rearward of the face as the bottom face is approached.

5. The electronic device of claim 1, wherein: a toggle spring is provided to apply a force to the cover toward the close position and the open position;

the one face is provided with a third tilting guide face positioned rearward of the face as the open/close face is approached;

the cover is provided with a third contact member so as to be capable of contacting with the third guide face from a direction opposite a direction in which the first contact member contacts with the first guide face; and the third contact member contacts with the third guide face at a close position of the cover.

6. The electronic device of claim 2, wherein: a width of the cover is orthogonal to a direction of moving the cover; and the oscillation regulating mechanism includes a fourth contact member and a fourth guide face, the fourth contact member being provided rearward of the cover opposite the one face at two locations with an interval in a width direction of the cover, and the fourth guide face being provided on the one side so that when the first contact member contacts with the sloping face and part of the cover near the non-open/close face is displaced frontward of the one face, the fourth guide face contacts with the fourth contact member from a direction opposite a direction for the first contact member to contact with the flat guide face and prevents the displacement.

7. The electronic device of claim 2, wherein: a width of the cover is orthogonal to a direction of moving the cover; and the oscillation regulating mechanism includes a fifth contact member and a fifth guide face, the fifth contact member being provided rearward of the cover opposite the one face at two locations with an interval in a width direction of the cover, and the fifth guide face being provided on the one face so that while the first contact member contacts with the flat guide face, the fifth guide face contacts with the fifth contact member from a direction opposite a direction for the first contact member to contact with the flat guide face.

8. The electronic device of claim 1, wherein: a guide pin protrudes from the cover toward the one face;

a guide groove is formed on the one face so as to extend along a direction of moving the cover and slidably guide the guide pin; and the guide pin contacts with one end of an extended line along the guide groove to determine the close position and contacts with the other end of an extended line along the guide groove to determine the open position.

9. The electronic device of claim 7, wherein the guide pin and the guide groove are provided at two locations with an interval in a direction of moving the cover on a single line extending in the direction of moving the cover.

10. The electronic device of claim 1, wherein: the one face includes the open/close face, the non-open/close face, and an intermediate face positioned therebetween; and a cushioning sheet is provided at both ends of a direction of moving the cover on a rear of the cover opposite the one face and elastically contacts with the open/close face and the intermediate face at the close position of the cover.

11. The electronic device of claim 1, wherein: the one face includes the cabinet assembled in the housing;

an inner cabinet is assembled in the housing rearward of the cabinet;

an electronic part is provided for the housing rearward of the inner cabinet; and a sheet member made of an insulative material is provided rearward of the inner cabinet and separates the inner cabinet from the electronic part.

* * * * *